(12) United States Patent
Oh et al.

(10) Patent No.: US 9,937,948 B2
(45) Date of Patent: Apr. 10, 2018

(54) STEERING INPUT APPARATUS FOR VEHICLE AND VEHICLE

(71) Applicant: LG ELECTRONICS INC., Seoul (KR)

(72) Inventors: Hyungseok Oh, Seoul (KR); Wonseok Yoo, Seoul (KR); Jeongsu Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/374,458

(22) Filed: Dec. 9, 2016

(65) Prior Publication Data
US 2017/0166237 A1    Jun. 15, 2017

(51) Int. Cl.
| | |
|---|---|
| B62D 5/04 | (2006.01) |
| B62D 1/04 | (2006.01) |
| B60K 35/00 | (2006.01) |
| B60Q 3/02 | (2006.01) |
| B60Q 9/00 | (2006.01) |
| B62D 1/28 | (2006.01) |
| B62D 15/02 | (2006.01) |

(52) U.S. Cl.
CPC ............. *B62D 1/046* (2013.01); *B60K 35/00* (2013.01); *B60Q 3/02* (2013.01); *B60Q 9/00* (2013.01); *B62D 1/28* (2013.01); *B62D 15/029* (2013.01); *B60K 2350/1076* (2013.01); *B60K 2350/92* (2013.01); *B60K 2350/921* (2013.01); *B60Q 2500/00* (2013.01); *B60Y 2400/306* (2013.01)

(58) Field of Classification Search
CPC ......... B60Q 9/00; B60Q 5/005; B60W 40/08; G08B 21/06; G08C 17/02; B62D 1/06; B62D 1/46; B60K 28/066; B60K 35/00; B60K 37/06
USPC ... 340/439, 575, 5.83, 438, 348, 349, 425.5, 340/459, 461, 545.4; 701/41; 180/422, 180/446
See application file for complete search history.

(56) References Cited

U.S. PATENT DOCUMENTS

| | | | |
|---|---|---|---|
| 4,210,905 A * | 7/1980 | Coons ................. | B60K 28/066 180/272 |
| 6,218,947 B1 * | 4/2001 | Sutherland ............ | G08B 21/06 180/272 |
| 6,868,934 B2 * | 3/2005 | Dirrig ..................... | B62D 1/06 180/422 |

(Continued)

FOREIGN PATENT DOCUMENTS

| | | |
|---|---|---|
| JP | 2007-083952 | 4/2007 |
| KR | 20-1998-0023725 | 7/1998 |

OTHER PUBLICATIONS

Extended European Search Report in European Application No. 16202987.0, dated Apr. 25, 2017, 7 pages (with English translation).

*Primary Examiner* — George Bugg
*Assistant Examiner* — Munear Akki
(74) *Attorney, Agent, or Firm* — Fish & Richardson P.C.

(57) ABSTRACT

A steering input apparatus for a vehicle includes a grip position sensor configured to sense a grip position on a rim of a steering wheel of the vehicle. The steering input apparatus also includes at least one processor configured to, based on a determination that the grip position on the rim of the steering wheel sensed through the grip position sensor is improper for a driving situation of the vehicle, perform a control operation to output grip guide information for the rim of the steering wheel.

20 Claims, 30 Drawing Sheets

(56) References Cited

U.S. PATENT DOCUMENTS

| | | | | |
|---|---|---|---|---|
| 7,019,623 B2* | 3/2006 | Klausner | ............... | B62D 1/046 |
| | | | | 340/425.5 |
| 7,605,693 B2* | 10/2009 | Kulas | .................... | B60K 35/00 |
| | | | | 340/438 |
| 8,260,482 B1 | 9/2012 | Szybalski et al. | | |
| 9,024,741 B2* | 5/2015 | Bennett | ................. | B60Q 5/005 |
| | | | | 340/425.5 |
| 9,159,221 B1* | 10/2015 | Stantchev | .............. | G08C 17/02 |
| 9,180,812 B2* | 11/2015 | Colvin, Sr. | ............ | B60Q 5/005 |
| 2004/0267422 A1* | 12/2004 | Bossler | ................... | B62D 1/06 |
| | | | | 701/41 |
| 2006/0070795 A1* | 4/2006 | Meissner | ............... | B60K 37/06 |
| | | | | 180/446 |
| 2009/0189772 A1* | 7/2009 | Christ | ............... | G08B 21/0415 |
| | | | | 340/575 |
| 2010/0141415 A1* | 6/2010 | Power | .................. | G08B 21/06 |
| | | | | 340/439 |
| 2011/0133919 A1* | 6/2011 | Evarts | ..................... | B60Q 9/00 |
| | | | | 340/439 |
| 2011/0187518 A1 | 8/2011 | Strumolo et al. | | |

* cited by examiner

STEERING INPUT APPARATUS FOR VEHICLE AND VEHICLE

CROSS-REFERENCE TO RELATED APPLICATIONS

This application claims an earlier filing date and right of priority to Korean Patent Application No. 10-2015-0175677, filed on Dec. 10, 2015 in the Korean Intellectual Property Office, the contents of which is incorporated herein by reference in its entirety.

TECHNICAL FIELD

The present disclosure relates to a steering input apparatus for vehicles and a vehicle including the same.

BACKGROUND

A vehicle is an apparatus that is moved in a desired direction by a user riding therein. A typical example of the vehicle is an automobile.

Vehicles have been increasingly equipped with various sensors and electronic devices to provide user convenience. In particular, various apparatuses for driver convenience are under development.

A vehicle includes a steering input apparatus. The driver provides an input for steering the vehicle through the steering input apparatus. A typical example of the steering input apparatus may be a steering wheel. Some drivers cause accidents because they do not properly grip the rim of the steering wheel.

SUMMARY

Systems and techniques are disclosed that enable a steering input apparatus that outputs grip guide information on a rim of a steering wheel of a vehicle.

In one aspect, a steering input apparatus for a vehicle may include a grip position sensor configured to sense a grip position on a rim of a steering wheel of the vehicle. The steering input apparatus may also include at least one processor configured to, based on a determination that the grip position on the rim of the steering wheel sensed through the grip position sensor is improper for a driving situation of the vehicle, perform a control operation to output grip guide information for the rim of the steering wheel.

In some implementations, the steering input apparatus may further include a grip guide output unit configured to output the grip guide information.

In some implementations, the grip guide output unit may be disposed in a region of the rim of the steering wheel designed to be gripped by both hands of a user.

In some implementations, the grip guide output unit may include at least one light emitter. The at least one processor may further be configured to, based on the determination that the grip position on the rim of the steering wheel of the vehicle sensed through the grip position sensor is improper for the driving situation of the vehicle, control a light emitter disposed in a region of the rim of the steering wheel designed to be gripped by a hand of the user to emit light of a first color.

In some implementations, the at least one processor may further be configured to, based on a determination that a grip of a first hand of a user is sensed on the steering input apparatus and that a grip of a second hand of the user is not sensed on the steering input apparatus, control a light emitter disposed in a region of the rim of the steering wheel designed to be requiring gripped by the second hand of the user to emit light.

In some implementations, the at least one processor may further be configured to, based on a determination that a grip of a first hand of a user is sensed on the steering input apparatus and that a grip of a second hand of the user is not sensed on the steering input apparatus, control a plurality of light emitters disposed in different regions of the rim of the steering wheel to emit light according to whether the driving situation of the vehicle corresponds to the vehicle travelling in a straight direction or along a curved road.

In some implementations, the at least one processor may further be configured to, based on a determination that the driving situation of the vehicle corresponds to the vehicle travelling in an entry section of a curved road, and that a grip of a first hand of a user is sensed in a region of the steering wheel rim that is improper for the driving situation corresponding to the vehicle travelling in an entry section of the curved road, and that a grip of a second hand of the user is not sensed on the steering input apparatus, control a plurality of light emitters disposed in regions of the rim of the steering wheel designed to be gripped by the first hand and the second hand of the user to emit light, the plurality of light emitters having positions along the rim of the steering wheel that correspond to a grip position that is proper for a curvature of the curved road.

In some implementations, the grip guide output unit may be disposed in one region of a cluster, a dashboard, or a windshield.

In some implementations, the steering input apparatus may further include a grip pressure sensor configured to sense a grip pressure applied by a user on the rim of the steering wheel. The at least one processor may further be configured to, based on a determination that the grip pressure sensed through the grip pressure sensor is less than or equal to a threshold pressure stored in a memory, output the grip guide information.

In some implementations, the at least one processor may further be configured to set the threshold pressure based on a user grip pressure received through the grip pressure sensor in a reference grip pressure setting mode.

In some implementations, the steering input apparatus may further include a grip guide output unit configured to output the grip guide information. The grip guide output unit may include at least one light emitter, and the at least one processor may further be configured to, based on a determination that the grip pressure sensed through the grip pressure sensor is less than or equal to the threshold pressure stored in the memory, control a light emitter disposed in a region of the rim of the steering wheel designed to be gripped by a hand of a user to emit light of a second color.

In some implementations, the at least one processor may further be configured to, based on the output grip guide information and based on a determination that the grip position sensed by the grip position sensor satisfies the output grip guide information, stop outputting the grip guide information.

In some implementations, the steering input apparatus may further include an interface unit, and the at least one processor may further be configured to, based on the output grip guide information and based on a determination that the grip position sensed by the grip position sensor does not satisfy the output grip guide information, provide a signal for control of the vehicle through the interface unit.

In some implementations, the steering input apparatus may further include a communication unit configured to communicate with at least one device other than the steering input apparatus. The at least one processor may further be configured to, based on the determination that the grip position sensed by the grip position sensor does not satisfy the output grip guide information, provide grip position information to the at least one device other than the steering input apparatus.

In some implementations, the steering input apparatus may further include an interface unit. The at least one processor may further be configured to, based on a determination that driving alert situation information is received through the interface unit, and based on a determination that the grip position on the rim of the steering wheel sensed through the grip position sensor is improper for the received driving alert situation information, output the grip guide information.

In some implementations, the received driving alert situation information may be based on at least one of road surface condition information, object detection information, weather information, surrounding illumination information, driver attentiveness information, driving road information, traffic light information, tire pressure information, or map information.

In some implementations, the at least one processor may further be configured to, based on a determination that a grip area of the grip position on the rim on the steering wheel detected through the grip position sensor is less than or equal to a threshold value of grip area, output the grip guide information.

In some implementations, the steering input apparatus may further include a grip guide output unit configured to output the grip guide information, the grip guide output unit including at least one light emitter. The at least one processor may further be configured to control an intensity or color of light emitted from the at least one light emitter according to the grip area of the grip position detected through the grip position sensor.

In some implementations, the steering input apparatus may further include a grip pressure sensor configured to sense a grip pressure on the rim of the steering wheel. The at least one processor may further be configured to, based on a determination that a grip area along a circumference of a cross section of the rim of the steering wheel for the grip position sensed through the grip position sensor is less than or equal to a threshold value of grip area, and based on a determination that the grip pressure sensed through the grip pressure sensor is less than or equal to a threshold value of grip pressure, perform a control operation to output the grip guide information.

In another aspect, a vehicle may include a steering input apparatus according to one or more of the implementations described above.

All or part of the features described throughout this disclosure can be implemented as a computer program product including instructions that are stored on one or more non-transitory machine-readable storage media, and that are executable on one or more processing devices. All or part of the features described throughout this disclosure can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims. The description and specific examples below are given by way of illustration only, and various changes and modifications will be apparent.

DETAILED DESCRIPTION

Systems and techniques are disclosed herein that enable a steering input apparatus that outputs grip guide information regarding a suitable grip on a rim of a steering wheel of a vehicle. The steering input apparatus may detect a driving situation of the vehicle and may also detect a grip applied by a user on the rim of the steering wheel. Based on the detected driving situation and the detected grip position on the steering wheel, the steering input apparatus may output an indication of whether the user's grip on the steering wheel is appropriate for the driving situation of the vehicle.

In some implementations, the steering input apparatus may output an indication of a recommended grip position that is suitable for the detected driving situation of the vehicle, for example by illuminating certain parts of the rim of the steering wheel that correspond to the an appropriate grip position. For example, the steering input apparatus may detect whether the user is applying a one-handed or two-handed grip, whether the user is applying sufficient pressure or area for the grip on the steering wheel, and/or whether a position of the user's grip is appropriate for a curvature of a road on which the vehicle is travelling.

The term "vehicle" employed in this disclosure may include an automobile and a motorcycle. Hereinafter, description will be given mainly focusing on an automobile, although implementations are not limited thereto and may be applied to any suitable vehicle.

A vehicle described in this specification may include a vehicle equipped with an internal combustion engine as a power source, a hybrid vehicle equipped with both an engine and an electric motor as a power source, an electric vehicle equipped with an electric motor as a power source, or generally a vehicle that is motorized by any suitable power source.

In the description below, the left side of the vehicle refers to the left side of the vehicle with respect to the travel direction of the vehicle and the right side of the vehicle refers to the right side of the vehicle with respect to the travel direction of the vehicle.

Figure 1:
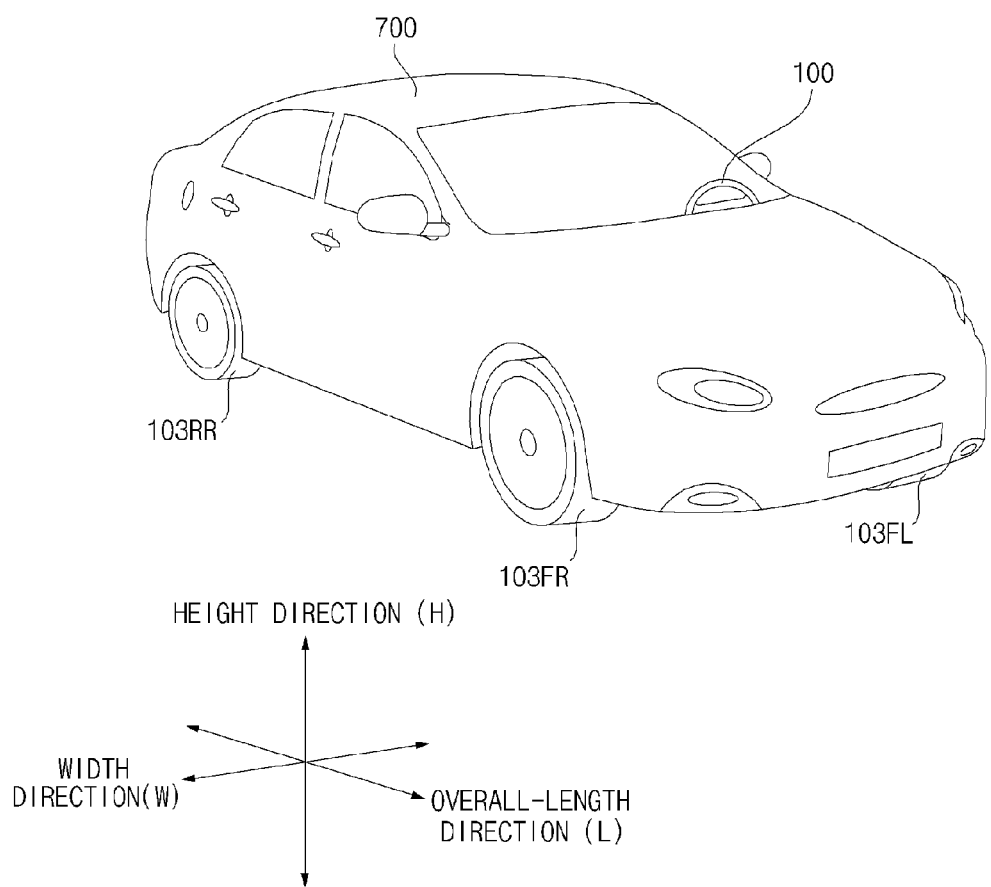
FIG. 1 is a diagram illustrating an example of the exterior of a vehicle.

FIG. 1 is a diagram illustrating an example of the exterior of a vehicle.

Referring to FIG. 1, a vehicle 700 may include wheels 103FR, 103FL, 103RL, . . . rotated by a power source and a steering input apparatus 100 for adjusting the travel direction of the vehicle 700.

The steering input apparatus 100 may include a steering wheel. The user may determine the travel direction of the vehicle 700 through the steering wheel.

A steering input received through the steering input apparatus 100 may be delivered to steered wheels. The steering input apparatus 100 may be electrically or mechanically connected to the steered wheels. Preferably, the steered wheels are front wheels 103FL and 103FR. It is also possible that the front wheels 103FL and 103FR and the rear wheels 103RR all operate as steered wheels.

Figure 2A:
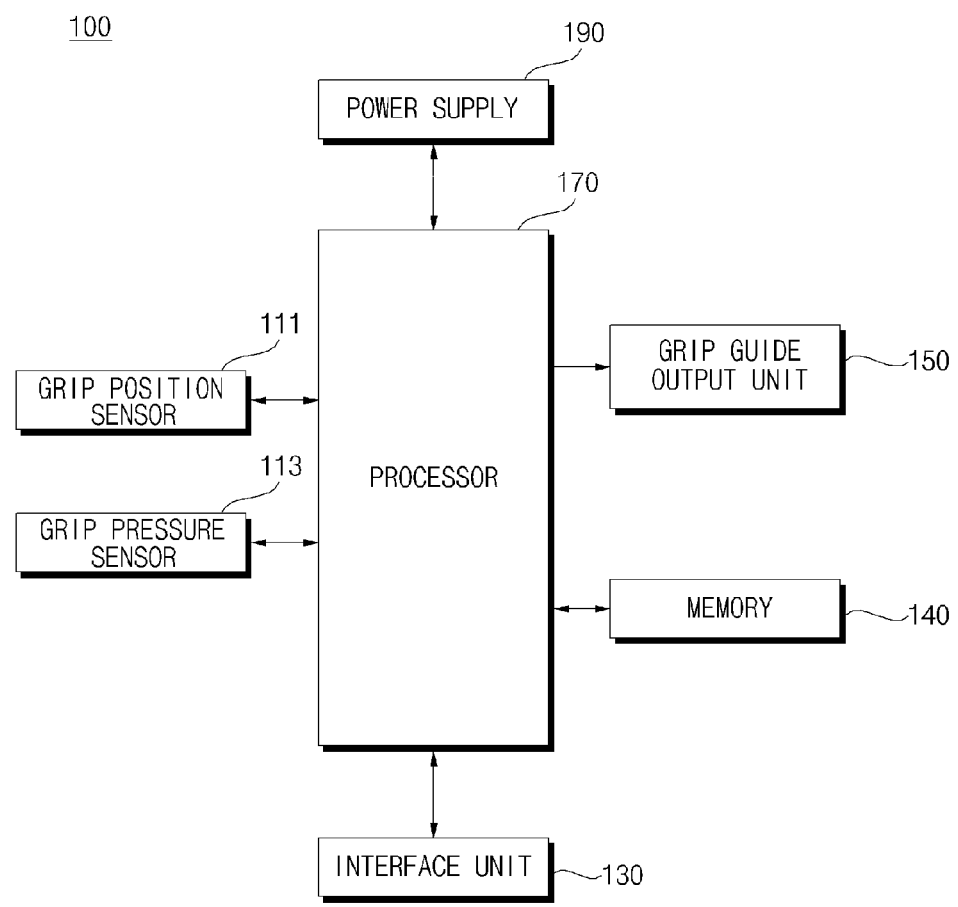
FIGS. 2A and 2B are block diagrams illustrating examples of a steering input apparatus.
Figure 2B:
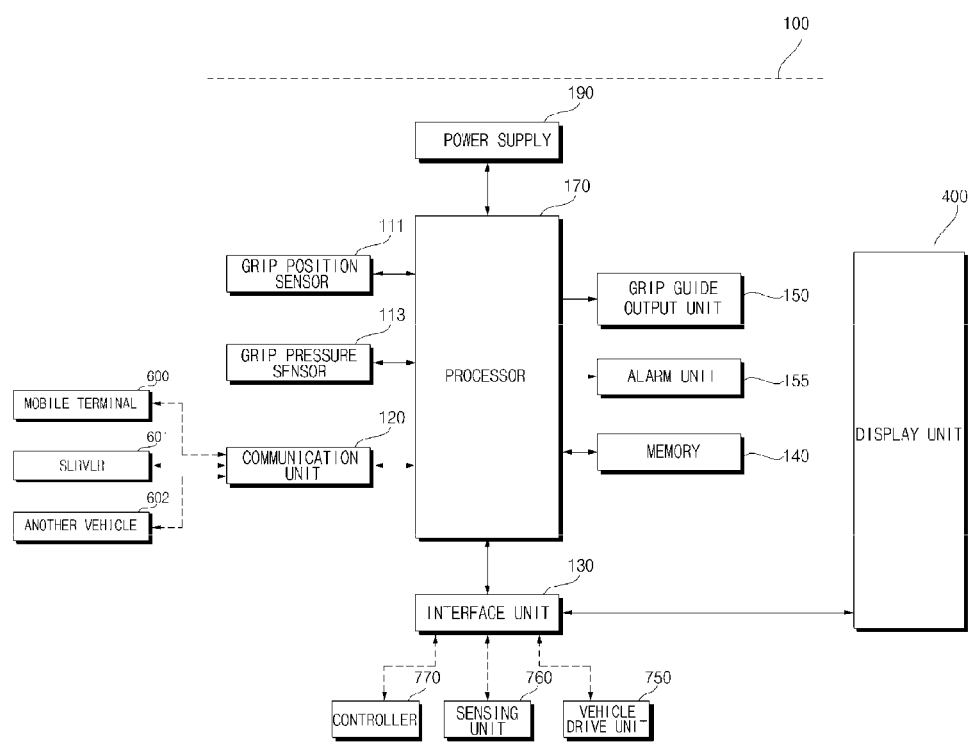

FIGS. 2A and 2B are block diagrams illustrating examples of a steering input apparatus.

Referring to FIG. 2A, the steering input apparatus 100 may include a grip position sensor 111, a grip pressure sensor 113, a memory 140, a grip guide output unit 150, a processor 170, and the power supply 190.

The grip position sensor 111 may sense the grip position on the steering wheel rim. The grip position may include two-handed grip information, one-handed grip information, grip area information, and/or grip type information.

The grip position sensor 111 may sense a grip of both hands, a grip of one hand, a grip area or a grip type of the user.

The grip position sensor 111 may include any suitable type of sensor that detects a position of a user's grip on a rim of a steering wheel.

In some implementations, the grip position sensor 111 may include at least one touch sensor. The touch sensor may be disposed in at least one area of the steering wheel rim. Preferably, the touch sensor is disposed in an area in which the user's hands are positioned to provide a steering input in the region of the rim of the steering wheel during driving.

For example, the touch sensor may be disposed over the whole region of the steering wheel rim. In this case, a single touch sensor may be provided. For example, the touch sensor may include a first touch sensor disposed over a part of the steering wheel rim from the upper left end to the lower left end and a second touch sensor disposed over a part of the steering wheel rim from the upper right end to the lower right end. For example, touch sensors may be disposed at the upper right end, upper left end, lower right end, and lower left end of the steering wheel rim. In this case, a plurality of touch sensors may be provided.

A sensing signal generated by the grip position sensor 111 may be delivered to the processor 170.

For example, when one touch sensor is disposed over a whole region of the steering wheel rim, the processor 170 may determine the grip position of the user on the steering wheel rim according to a part of the touch sensor through which touch is sensed.

For example, when a plurality of sensors is disposed on the steering wheel rim, the processor 170 may determine a grip of the user on the steering wheel rim according to a touch sensor through which touch is sensed.

In some implementations, the grip position sensor 111 may include a camera. Herein, the camera may include a lens, an image sensor, and a processor. The camera may capture an image of the steering wheel rim and the user's hands. The camera may sense the grip position of the user on the steering wheel rim through image processing.

The grip pressure sensor 113 may sense a grip pressure. The grip pressure sensor 113 may sense the magnitude of pressure applied by the user when the user grips the steering wheel rim.

The grip pressure sensor 113 may include at least one pressure sensor. The pressure sensor may be disposed in at least one area of the steering wheel rim. Preferably, the pressure sensor is disposed in an area in which the user's hands are positioned to provide a steering input in the region of the rim of the steering wheel during driving. For example, the pressure sensor may be disposed over the whole region of the steering wheel rim. In this case, a single pressure sensor may be provided. For example, the pressure sensor may include a first pressure sensor disposed over a part of the steering wheel rim from the upper left end to the lower left end and a second pressure sensor disposed over a part of the steering wheel rim from the upper right end to the lower right end. For example, touch sensors may be disposed at the upper right end, upper left end, lower right end, and lower left end of the steering wheel rim. In this case, a plurality of pressure sensors may be provided.

A sensing signal generated by the grip pressure sensor 113 may be delivered to the processor 170.

The grip pressure sensor 113 may sense the grip pressure of the user in order to store a reference pressure. For example, when a grip pressure reference setting mode is set, the grip pressure sensor 113 may sense the grip pressure of the user. In this case, the sensed grip pressure may become a reference pressure.

The interface unit 130 may receive data from a system, a unit or an apparatus in the vehicle or transmit a signal processed or generated by the processor 170. To this end, the interface unit 130 may perform data communication with the controller 770, a display apparatus 400 for vehicles, a sensing unit 760, a vehicle drive unit 750 and an input unit 720, which are included in the vehicle, through wired or wireless communication. For example, the interface unit 130 may exchange data with a system, a unit or an apparatus in the vehicle through CAN communication.

The interface unit 130 may receive navigation information through communication with the controller 770, the display apparatus 400 or a separate navigation apparatus. Herein, the navigation information may include designated destination information, route information according to the destination, map information, and location information about the vehicle (e.g., GPS information), wherein the map information and location information are related to traveling of the vehicle.

The interface unit 280 may receive sensor information from the controller 770 or the sensing unit 760.

Herein, the sensor information may include at least one of vehicle direction information, vehicle location information (GPS information), vehicle orientation information, vehicle speed information, vehicle acceleration information, vehicle inclination information, vehicle drive/reverse information, battery information, fuel information, tire information, vehicular lamp information, vehicle interior temperature information, vehicle interior humidity information, and information about whether or not it rains.

Such sensor information may be acquired from a heading sensor, a yaw sensor, a gyro sensor, a position module, a vehicle drive/reverse drive sensor, a wheel sensor, a vehicle speed sensor, a vehicle body tilt sensor, a battery sensor, a fuel sensor, a tire sensor, a steering sensor based on turning of the steering wheel, a vehicle interior temperature sensor, a vehicle interior humidity sensor, and a rain sensor. The position module may include a GPS module for receiving GPS information.

Among the pieces of sensor information, the vehicle direction information, vehicle location information, vehicle orientation information, vehicle speed information and vehicle inclination information, which are related to traveling of the vehicle, may be called vehicle travel information.

The interface unit 130 may provide a signal to the controller 770 or the vehicle drive unit 750. Herein, the signal may be a control signal. For example, the processor 170 may provide an acceleration control signal to a power source drive unit 751. For example, the processor 170 may provide a steering control signal to a steering drive unit 752 through the interface unit 130. For example, the processor 170 may provide a deceleration control signal to a brake drive unit 753 through the interface unit 130.

The memory 140 may store various kinds of data for overall operation of the steering input apparatus 100 including a program for the processing or controlling operation of the processor 170.

When implemented as hardware, the memory 140 may include various storage devices such as a ROM, RAM, EPROM, flash drive, and hard drive.

The memory 140 may store a reference pressure. When a grip pressure reference setting mode is set, the memory 140 may store a sensed grip pressure of the user as a reference pressure.

The memory 140 may also store a reference area for the user's grip. For example, the reference area may be determined based on an area of the steering wheel which contacts the palm or fingers of an adult when the adult grips the steering rim.

The grip guide output unit 150 may output grip guide information.

The grip guide output unit 150 may be disposed in a region of the steering wheel rim in which both-hand grip of the user on the steering wheel rim is required. For example, the grip guide output unit 150 may be disposed at the upper right end and upper left end of the steering wheel rim. For example, the grip guide output unit 150 may be disposed at the lower right end and lower left end of the steering wheel rim. As the grip guide output unit 150 is disposed in this way, the user may be guided to safe driving.

The grip guide output unit 150 may include at least one light emitter. For example, the grip guide output unit 150 may include a light emitting device such as a light emitting diodes (LED) and a laser diode (LD).

The grip guide output unit 150 may be disposed in one region of the cluster, dashboard or windshield. In this case, the user may recognize a grip guide output while looking forward.

The processor 170 controls overall operation of each unit in the steering input apparatus 100.

The processor 170 may receive grip position information from the grip position sensor 111. The processor 170 may determine whether the grip position is improper for the driving situation, based on the grip position information received from the grip position sensor 111. If the grip position is not proper for the driving situation, the processor 170 may output grip guide information on the steering wheel rim through the grip guide output unit 150.

If the grip position sensed through the grip position sensor 111 is improper for the driving situation, the processor 170 may control a light emitter disposed in a region in which the user's hands are required to grip the steering wheel rim such that the light emitter emits light of a first color.

If grip of a first hand is sensed, but grip of a second hand is not sensed, the processor 170 may control a light emitter disposed in a region in which grip of the second hand is required, such that the light emitter emits light. For example, if only grip of the left hand is sensed, the processor 170 may control a light emitter disposed at an upper right end of the steering wheel rim to emit light to guide grip of the right hand. For example, if only grip of the right hand is sensed, the processor 170 may perform a control operation such that a light emitter disposed at an upper left end of the steering wheel rim to guide grip of the left hand emits light.

If grip of the first hand is sensed, but grip of the second hand is not sensed, the processor 170 may control light emitters disposed in different regions to emit light according to whether the vehicle travels straight forward or along a curve. For example, the processor 170 may receive, through the interface unit 130, information about whether a road in front of the vehicle is a straight road or a curved road. The processor 170 may control light emitters disposed in different regions to emit light according to whether the road in front of the vehicle is a straight road or a curved road, based on the received information.

If grip of the first hand is sensed in an improper region of the steering wheel rim, and grip of the second hand is not sensed when the vehicle 700 is positioned in a curve entry section, the processor 170 may control light emitters disposed in regions in which grip of the first hand and the second hand correspond to the curvature of the curve. In this case, when a vehicle enters the curve, incorrect steering input according to an improper grip may be prevented from being provided.

The processor 170 may calculate a grip area based on the grip position information received from the grip position sensor 111. If the grip position sensor 111 includes a touch sensor, the grip area may be calculated based on the area of a part of the touch sensor that is touched by the user.

If the grip area does not satisfy a threshold area, for example by being less than or equal to a reference area, then the processor 170 may output grip guide information. For example, if the grip area is less than or equal to the reference area, the processor 170 may control a light emitter disposed in a region in which grip of the user's hand is required, such that the light emitter emits light in a third color. For example, the reference area may be determined based on an area of the steering wheel which the palm or fingers of an adult gripping the steering wheel rim contact.

The processor 170 may control the intensity or color of light emitted from the light emitter of the grip guide output unit 150 according to the grip area.

The processor 170 may receive grip pressure information from the grip pressure sensor 113.

If the grip pressure sensed through the grip pressure sensor 113 does not satisfy a threshold pressure, for example by being less than or equal to a reference pressure, then the processor 170 may output grip guide information. Herein, the reference pressure may be set based on a user grip pressure received through the grip pressure sensor 113 in the grip pressure reference setting mode. The reference pressure may be stored in the memory 140.

If the grip pressure sensed through the grip pressure sensor 113 is less than or equal to the reference pressure stored in the memory 140, the processor 170 may control a light emitter disposed in a region in which grip of a user hand is required, such that the light emitter emits light of the second color. If the gripping force applied to the steering wheel rim by the user is weak, the user may lose a grip on the steering wheel rim in a certain driving situation, which may result in an accident. In this case, the accident may be prevented when the user is guided to properly grip the steering wheel rim according to the driving situation.

The processor 170 may control the intensity or color of the emitted light according to the sensed grip pressure. For example, the processor 170 may assign levels to sensed grip pressures and perform a control operation to output light of an intensity or color corresponding to a given level.

In contrast with the case of grip of one hand, light of a second color may be controlled to be emitted such that the user can recognize whether grip of both hands is required or a higher grip pressure is required.

If a grip area sensed through the grip position sensor 111 along a circumference of the cross section of the steering wheel rim is less than or equal to a reference area, and the grip pressure detected through the grip pressure sensor 113 is less than or equal to a reference pressure, the processor 170 may perform a control operation to output grip guide information. In this case, the grip guide information may be output using various methods described in this specification.

If a proper grip according to the grip guide information is sensed, the processor 170 may stop outputting the grip guide information.

If a proper grip according to the grip guide information is not sensed, the processor 170 may provide, through the interface unit 130, a signal for control of driving of the vehicle. For example, if a dangerous situation is sensed without a proper grip according to the grip guide information implemented, the processor 170 may provide a control signal to the vehicle drive unit 750. In this case, the processor 170 may provide a steering control signal to the steering drive unit 752, or provide a brake control signal to the brake drive unit 753. Meanwhile, the dangerous situation may be a situation of collision with an object (e.g., another vehicle, a two-wheeled vehicle, a pedestrian or a structure).

The processor 170 may receive driving alert situation information through the interface unit 130. If the processor 170 senses a grip on the steering wheel rim which is improper for the driving alert situation information, the processor 170 may output grip guide information.

The driving alert situation information may be generated based on at least one of the vehicle speed information, road surface condition information, object detection information, weather information, surrounding illumination information, driver attentiveness information, driving road information, traffic light information, tire pressure information and map information.

The vehicle speed information, the surrounding illumination information and the tire pressure information may be provided from the sensing unit 760.

The road surface condition information, the object detection information, the driver attentiveness information and the traffic light information may be provided from a camera 195 of the vehicle 700.

The weather information, the driving road information and the map information may be provided from a communication unit 710 of the vehicle 700. The driving road information and the map information may be provided from the display apparatus 400 or a navigation apparatus.

Meanwhile, the processor 170 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The power supply 190 may be controlled by the processor 170 to supply electric power necessary for operation of respective constituents. In particular, the power supply 190 may receive power from, for example, a battery in the vehicle.

Referring to FIG. 2B, the steering input apparatus 100 may further include a communication unit 120 and an alarm unit 155.

The communication unit 120 may communicate with other devices 600, 601 and 602. For example, the communication unit 120 may wirelessly exchange data with a mobile terminal 600, a server 601 or another vehicle 602. In particular, the communication unit 120 may wirelessly exchange data with a mobile terminal of the vehicle driver. Applicable wireless data communication schemes may include Bluetooth, Wi-Fi Direct, Wi-Fi, APiX, and NFC.

The communication unit 120 may receive weather information and traffic situation information (e.g., TPEG (Transport Protocol Expert Group)) from the mobile terminal 600 or the server 601. Meanwhile, the steering input apparatus 100 may transmit recognized real-time information to the mobile terminal 600 or the server 601.

When the user enters the vehicle, the mobile terminal 600 of the user may be paired with the steering input apparatus 100 automatically or by execution of an application by the user.

The communication unit 120 may receive change-of-traffic light information from the external server 601. Herein, the external server 601 may be a server positioned at a traffic control center that controls traffic. The alarm unit 155 may output an alarm to the user.

The alarm unit 155 may include a display for outputting a visible alarm. The alarm unit 155 may include a speaker for outputting an audible alarm. The alarm unit 155 may include a haptic module for outputting a haptic alarm. According to an implementation, the haptic module may be provided to the steering wheel, a seat or a pedal.

If a proper grip according to the grip guide information is not sensed, the processor 170 may provide grip position information to other devices through the communication unit 120.

For example, while a driver having recently obtained a driver's license drives the vehicle 700 which is property of a parent of the driver, if a proper grip according to the grip guide information is not sensed, the processor 170 may provide the grip position information about the driver to the mobile terminal 600 of the parent through the communication unit 120.

If a proper grip according to the grip guide information is not sensed, the processor 170 may output an alarm through the alarm unit 155.

Figure 3:
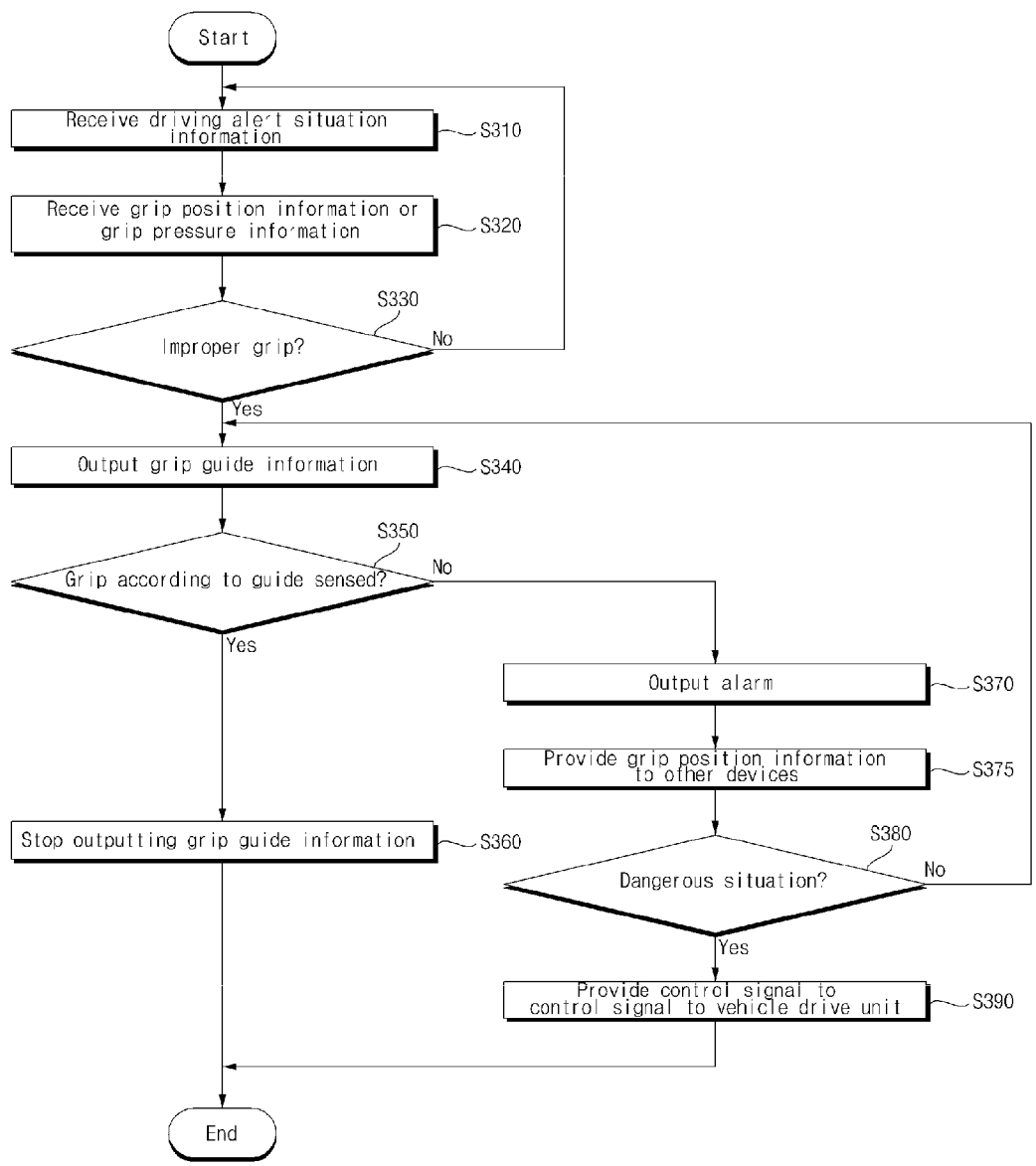
FIG. 3 is a flowchart illustrating an example of an operation of the steering input apparatus.

FIG. 3 is a flowchart illustrating an example of an operation of the steering input apparatus.

Referring to FIG. 3, the processor 170 may receive driving alert situation information through the interface unit 130 (S310).

The driving alert situation information may be generated based on at least one of the vehicle speed information, road surface condition information, object detection information, weather information, surrounding illumination information, driver attentiveness information, driving road information, traffic light information, tire pressure information and map information.

The processor 170 may receive grip position information or grip pressure information (S320).

The processor 170 may receive grip position information from the grip position sensor 111. The grip position may include both-hand grip information, one-hand grip information, grip area information or grip type information.

The processor 170 may receive grip pressure information of the grip pressure sensor 113.

The processor 170 may determine whether or not the grip position is proper for the driving situation based on the received grip position information (S330). Alternatively, the processor 170 may determine whether or not the grip pressure is improper for the driving situation based on the received grip pressure information.

For example, if gripping is performed by one hand, the processor 170 may determine that the grip is improper. For example, if the grip area is less than or equal to a reference area, the processor 170 may determine that the grip is improper. For example, if the grip pressure is less than or equal to a reference pressure, the processor 170 may determine that the grip is improper.

Once it is determined that the grip is improper, the processor 170 may output grip guide information through the grip guide output unit 150 (S340).

For example, if the grip position sensed through the grip position sensor 111 is improper for the driving situation, the processor 170 may control a light emitter disposed in a region in which grip of a user hand is required, such that the light emitter emits light of a first color.

For example, if the sensed grip pressure is less than or equal to the reference pressure, the light emitter disposed in the region in which the grip of the user hand is required may be controlled to emit light of a second color.

For example, if the grip area is less than or equal to a reference area, the processor 170 may control the light emitter disposed in the region in which grip of the user hand is required, such that the light emitter emits light in a third color.

If a grip according to the guide information is sensed (S350), the processor 170 may stop outputting grip guide information (S360).

If a grip according to the guide information is not sensed (S350), the processor 170 may output an alarm through the alarm unit 155 (S370). Herein, the alarm may be a visible alarm, an audible alarm, or a haptic alarm.

If a grip according to the grip guide information is not sensed (S350), the processor 170 may provide grip position information to other devices through the communication unit 120 (S375).

A dangerous situation may be sensed while a proper grip according to the grip guide information is not sensed (S380). The processor 170 may receive dangerous situation information from the camera 195 or the sensing unit 760 through the interface unit 130. The dangerous situation may be a situation of collision with an object (e.g., another vehicle, a two-wheeled vehicle, a pedestrian or a structure).

When a dangerous situation is sensed, the processor 170 may provide, through the interface unit 130, a signal for control of driving of the vehicle (S390). The processor 170 may provide a steering control signal to the steering drive unit 752 or provide a brake control signal to the brake drive unit 753.

Figure 4:
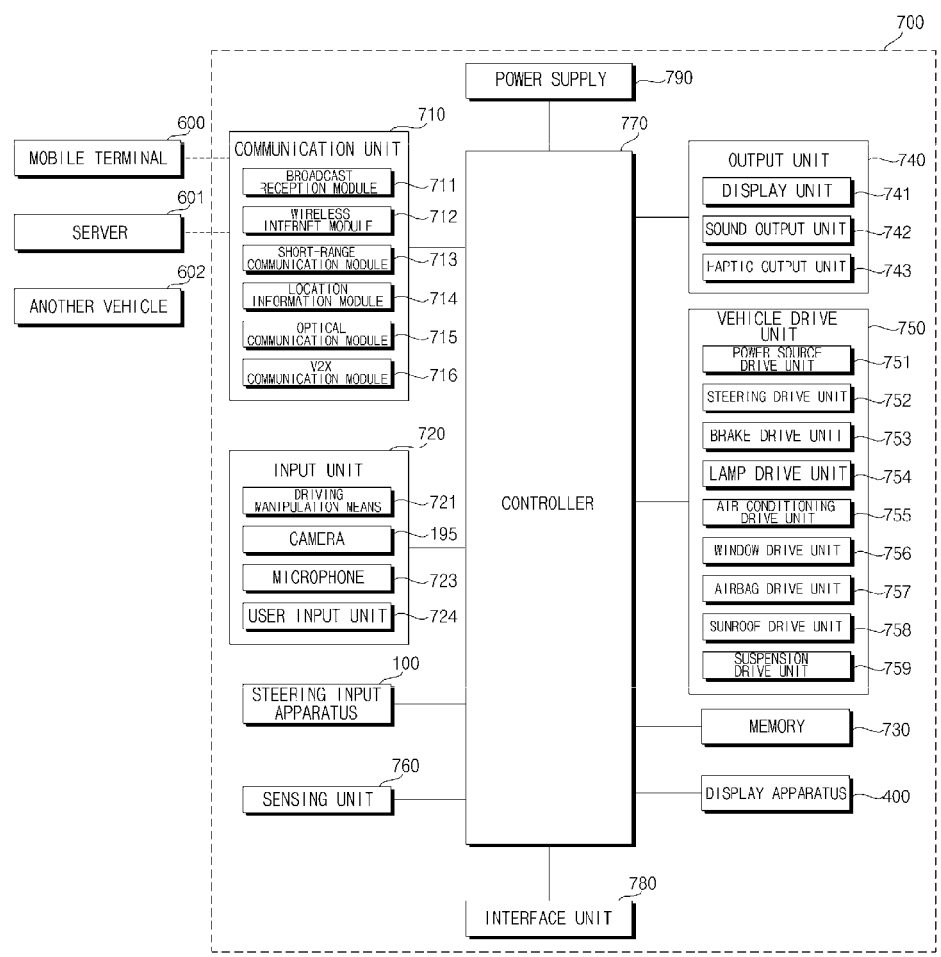
FIG. 4 is a block diagram illustrating an example of a vehicle 700.

FIG. 4 is a block diagram illustrating an example of the vehicle 700.

Referring to FIG. 4, the vehicle 700 may include the communication unit 710, the input unit 720, the sensing unit 760, an output unit 740, the vehicle drive unit 750, a memory 730, an interface unit 780, the controller 770, a power supply 790, the steering input apparatus 100, and a display apparatus 400 for the vehicle.

The communication unit 710 may include at least one module enabling wireless communication between the vehicle 700 and a mobile terminal 600, between the vehicle 700 and an external server 601, or between the vehicle 700 and another vehicle 602. The communication unit 710 may also include at least one module for connecting the vehicle 700 to at least one network.

The communication unit 710 may include a broadcast reception module 711, a wireless Internet module 712, a short-range communication module 713, a location information module 714, an optical communication module 715, and a V2X communication module 716.

The communication unit 710 may receive weather information. The communication unit 710 may receive the weather information from an external source through the broadcast reception module 711, the wireless Internet module 712, or the V2X communication module 716.

The communication unit 710 may receive driving road information. The communication unit 710 may recognize the location of the vehicle 700 through the location information module 714, and may receive road information corresponding to the location of the vehicle 700 through the wireless Internet module 712 or the V2X communication module 716.

The communication unit 710 may receive traffic light change information from the external server 601 through the V2X communication module 716.

The broadcast reception module 711 receives a broadcast signal or broadcast-related information from an external broadcast management server over a broadcast channel. Herein, the broadcast includes radio broadcast or TV broadcast.

The wireless Internet module 712, which refers to a module for wireless Internet access, may be internally or externally installed to the vehicle 700. The wireless Internet module 712 is configured to transmit and receive a radio signal over a communication network according to wireless Internet technologies.

Examples of wireless Internet technologies include Wireless LAN (WLAN), Wi-Fi, Wi-Fi Direct, Digital Living Network Alliance (DLNA), Wireless Broadband (WiBro), World Interoperability for Microwave Access (WiMAX), High Speed Downlink Packet Access (HSDPA), High Speed Uplink Packet Access (HSUPA), Long Term Evolution (LTE), and Long Term Evolution-Advanced (LTE-A). The wireless Internet module 712 transmits and receives data according to at least one of the aforementioned wireless Internet technologies. For example, the wireless Internet module 712 may wirelessly exchange data with the external server 601. The wireless Internet module 712 may receive weather information and traffic situation information (e.g., TPEG (Transport Protocol Expert Group)) from the external server 601.

The short-range communication module 713, which is used for short-range communication, may support short-range communication using at least one of Bluetooth™, Radio Frequency Identification (RFID), Infrared Data Association (IrDA), ultra wideband (UWB), ZigBee, Near Field Communication (NFC), Wi-Fi, Wi-Fi Direct, and Wireless Universal Serial Bus (Wireless USB) technologies.

The short-range communication module 713 may establish a wireless local area network to implement short-range communication between the vehicle 700 and at least one external device. For example, the short-range communication module 713 may wirelessly exchange data with the mobile terminal 600. The short-range communication module 713 may receive weather information and traffic situation information (e.g., TPEG (Transport Protocol Expert Group)) from the mobile terminal 600. For example, once a user enters the vehicle 700, the mobile terminal 600 of the user may be paired with the vehicle 700 automatically or by execution of an application by the user.

A typical example of the location information module 714, which serves to acquire the location of the vehicle 700, is a global positioning system (GPS) module. For example, if the vehicle utilizes the GPS module, the location of the vehicle may be acquired using a signal from a GPS satellite.

The optical communication module 715 may include a light transmitter and a light receiver.

The light receiver may covert a light signal into an electrical signal to receive information. The light receiver may include a photodiode (PD) for receiving light. The PD is capable of converting light into an electrical signal. For example, the light receiver may receive information on a preceding vehicle through light emitted from a light source included in the foregoing vehicle.

The light transmitter may include at least one light emitting device for converting an electrical signal into a light signal. Preferably, the light emitting device is a light emitting diode (LED). The light transmitter converts an electrical signal into a light signal and transmits the light signal outside. For example, the light transmitter transmits a light signal by blinking a light emitting device at a predetermined frequency. According to some implementations, the light transmitter may include an array of a plurality of light emitting devices. According to some implementations, the light transmitter may be integrated with a lamp provided to the vehicle 700. For example, the light transmitter may be at least one of a headlight, a taillight, a stop lamp, a turn signal lamp and a sidelight. For example, the optical communication module 715 may exchange data with the vehicle 602 through optical communication.

The V2X communication module 716 serves to perform wireless communication with the server 601 or another vehicle 602. The V2X communication module 716 includes a module capable of implementing a vehicle-to-vehicle communication (V2V) protocol or a vehicle-to-infrastructure communication (V2I) protocol. The vehicle 700 may perform wireless communication with the external server 601 or the vehicle 602 through the V2X communication module 716.

The input unit 720 may include a camera 195, a microphone 723 and a user input unit 724.

The camera 195 may include an image sensor and an image processing module. The camera 195 may process a still image or a moving image obtained by the image sensor (e.g., CMOS or CCD). The processing module may extract necessary information by processing the still image or moving image obtained through the image sensor, and transfer the extracted information to the controller 770. Meanwhile, the vehicle 700 may include a camera 195 for capturing a vehicle front view image or a surroundings-of-vehicle image and an interior camera for capturing images of the interior of the vehicle.

The camera 195 may acquire a vehicle front view image or a surroundings-of-vehicle image. The camera 195 may process an acquired image and provide information. The camera 195 may detect an object based on the acquired image and track the detected object. In detecting objects, the camera 195 may perform lane detection (LD), vehicle detection (VD), pedestrian detection (PD), bright-spot detection (BD), traffic sign recognition (TSR), and road surface detection.

The camera 195 may provide road surface condition information based on the vehicle front view image or the surroundings-of-vehicle image.

The camera 195 may provide object detection information. Herein, the object information may include presence or absence of an object, information about the distance between the vehicle 700 and the object, and information about the relative speed of the object with respect to the vehicle 700. For example, the camera 195 may be a stereo camera. In this case, the camera 195 may calculate the distance information about the object based on disparity information. The camera 195 may calculate the relative speed information about the object based on the detected distance information.

The camera 195 may sense a dangerous situation. Herein, the dangerous situation may be a situation of collision with an object (e.g., another vehicle, a two-wheeled vehicle, a pedestrian or a structure). The processor of the camera 195 may sense a dangerous situation based on the distance to the object.

The camera 195 may detect a traffic light and provide traffic light information.

The interior camera may acquire an image of passengers. The interior camera may analyze driver motion information and gaze information in the image to provide driver attentiveness information.

While FIG. 4 illustrates the camera 195 as being included in the input unit 720, the camera 195 may be a constituent included in the sensing unit 760.

The microphone 723 may process an external sound signal to create electrical data. The data created through processing may be utilized for various purposes according to functions being executed by the vehicle 700. The microphone 723 may convert a voice command from the user into electrical data. The electrical data may be delivered to the controller 770.

According to an implementation, the camera 722 or microphone 723 may be a constituent included in the sensing unit 760 rather than in the input unit 720.

The user input unit 724 is intended to receive information input by the user. When information is input through the user input unit 724, the controller 770 may control operation of the vehicle 700 in accordance with the input information. The user input unit 724 may include a touch input means or a mechanical input means. According to some implementations, the user input unit 724 may be disposed in one area of the steering wheel. In this case, the driver may manipulate the user input unit 724 with fingers while holding the steering wheel.

The sensing unit 760 senses a signal related to traveling of the vehicle 700. To this end, the sensing unit 760 may include a collision sensor, a wheel sensor, a speed sensor, a tilt sensor, a weight sensor, a heading sensor, a yaw sensor, a gyro sensor, a position module, a vehicle drive/reverse sensor, a battery sensor, a fuel sensor, a tire sensor, a steering sensor based on turning of the steering wheel, a vehicle interior temperature sensor, a vehicle interior humidity sensor, a rain sensor, an illumination sensor, a tire pressure sensor, an ultrasonic sensor, radar, and lidar (Light Detection And Ranging).

Thereby, the sensing unit 760 may acquire sensing signals carrying vehicle collision information, vehicle direction information, vehicle location information (GPS information), vehicle orientation information, vehicle speed information, vehicle acceleration information, vehicle inclination information, vehicle drive/reverse information, battery information, fuel information, tire information, vehicle lamp information, vehicle interior temperature information, vehicle interior humidity information, information about whether it rains, an angle by which the steering wheel is rotated, surrounding illumination sensor, and tire pressure information.

The sensing unit 760 may further include an accelerator pedal sensor, a pressure sensor, an engine speed sensor, an air flow sensor (AFS), an intake air temperature sensor (ATS), a water temperature sensor (WTS), a throttle position sensor (TPS), a TDC sensor, and a crankshaft angle sensor (CAS).

The ultrasonic sensor, radar, or lidar may detect and track an object. The ultrasonic sensor, radar, or lidar may calculate the distance and relative speed of the detected object.

The ultrasonic sensor, radar, or lidar may sense a dangerous situation. The processor included in the ultrasonic sensor, radar, or lidar may sense a dangerous situation based on the distance to the object.

The sensing unit 760 may include a biometric identification information sensing unit. The biometric identification information sensing unit senses and acquires biometric identification information of a passenger. The biometric identification information may include fingerprint information, iris scan information, retina scan information, hand geometry information, facial recognition information, and voice recognition information. The biometric identification information sensing unit may include a sensor for sensing biometric identification information of a person in the vehicle. Herein, the interior camera and the microphone 723 may operate as sensors. The biometric recognition information sensing unit may acquire hand shape information and face recognition information through the interior camera.

The output unit 740, which serves to output information processed by the controller 770, may include a display unit 741, a sound output unit 742 and a haptic output unit 743.

The display unit 741 may display information processed by the controller 770. For example, the display unit 741 may display vehicle-related information. Herein, the vehicle-related information may include vehicle control information for controlling the direction of the vehicle or vehicle driving assistance information for assisting the driver in driving the vehicle. The vehicle-related information may also include vehicle condition information indicating the current condition of the vehicle or vehicle driving information related to driving.

The display unit 741 may include at least one of a liquid crystal display (LCD), a thin film transistor-liquid crystal display (TFT LCD), an organic light-emitting diode (OLED) display, a flexible display, a 3D display and an e-ink display.

The display unit 741 may form a layered architecture together with a touch sensor or be integrated with the touch sensor, thereby implementing a touchscreen. Such touchscreen may function as the user input unit 724 providing an input interface between the vehicle 700 and the user and also as an output interface between the vehicle 700 and the user. In this case, the display unit 741 may include a touch sensor for sensing touch applied to the display unit 741 in order to receive a control command in a touch manner. Thereby, when the display unit 741 is touched, the touch sensor may sense the touch, and the controller 770 may generate a control command corresponding to the touch. Content input through touch may include characters, numbers, or menu items which can be indicated or specified in various modes.

Meanwhile, the display unit 741 may include a cluster to allow the driver to check the vehicle condition information or vehicle driving information during driving. The cluster may be positioned on the dashboard. In this case, the driver can check the information displayed on the cluster while looking forward.

According to some implementations, the display unit 741 may be implemented as a head up display (HUD). If the display unit 741 is implemented as the HUD, information may be output through a transparent display provided to the windshield. Alternatively, the display unit 741 may be provided with a projection module, thereby outputting information through an image projected onto the windshield.

The sound output unit 742 converts an electrical signal from the controller 770 into an audio signal and outputs the audio signal. To this end, the sound output unit 742 may be provided with a speaker. The sound output unit 742 may output sound corresponding to operation of the user input unit 724.

The haptic output unit 743 generates haptic output. For example, the haptic output unit 743 may vibrate the steering wheel, a seat belt and a seat to allow the user to recognize the output.

The vehicle drive unit 750 may control operations of various vehicular devices. The vehicle drive unit 750 may receive a control signal from the steering input apparatus 100. The vehicle drive unit 750 may control various devices based on the control signal.

The vehicle drive unit 750 may include a power source drive unit 751, a steering drive unit 752, a brake drive unit 753, a lamp drive unit 754, an air conditioning drive unit 755, a window drive unit 756, an airbag drive unit 757, a sunroof drive unit 758 and a suspension drive unit 759.

The power source drive unit 751 may perform electronic control of the power source in the vehicle 700.

For example, if a fossil fuel-based engine is the power source, the power source drive unit 751 may perform electronic control of the engine. Thereby, the output torque of the engine may be controlled. If the power source drive unit 751 is an engine, the output torque of the engine may be controlled by the controller 770 to limit the speed of the vehicle.

As another example, if an electric motor is the power source, the power source drive unit 751 may control the motor. Thereby, the rotational speed and torque of the motor may be controlled.

The power source drive unit 751 may receive an acceleration control signal from the steering input apparatus 100.

The power source drive unit 751 may control the power source according to the received acceleration control signal.

The steering drive unit 752 may perform electronic control of the steering apparatus in the vehicle 700. Thereby, the steering drive unit 752 may change the travel direction of the vehicle. The steering drive unit 752 may receive a steering control signal from the steering input apparatus 100. The steering drive unit 752 may control the steering apparatus to be steered according to the steering control signal.

The brake drive unit 753 may perform electronic control of a brake apparatus in the vehicle 700. For example, by controlling the operation of the brakes disposed on the wheels, the speed of the vehicle 700 may be reduced. In another example, the brake disposed on a left wheel may be operated differently from the brake disposed on a right wheel in order to adjust the travel direction of the vehicle 700 to the left or right. The brake drive unit 753 may receive a deceleration control signal from the steering input apparatus 100. The brake drive unit 753 may control the brake apparatus according to the received deceleration control signal.

The lamp drive unit 754 may control lamps disposed inside and outside the vehicle to be turned on/off. In addition, the lamp drive unit 754 may control the intensity and direction of light from the lamps. For example, the lamp drive unit 754 may control a turn signal lamp and a brake lamp.

The air conditioning drive unit 755 may perform electronic control of an air conditioner in the vehicle 700. For example, if the temperature of the interior of the vehicle is high, the air conditioning drive unit 755 may control the air conditioner to supply cool air to the interior of the vehicle.

The window drive unit 756 may perform electronic control of a window apparatus in the vehicle 700. For example, the window drive unit 756 may control opening or closing of the left and right windows on both sides of the vehicle.

The airbag drive unit 757 may perform electronic control of an airbag apparatus in the vehicle 700. For example, the unit may control the airbag apparatus such that the airbags are inflated when the vehicle is exposed to danger.

The sunroof drive unit 758 may perform electronic control of a sunroof apparatus in the vehicle 700. For example, the sunroof drive unit 758 may control opening or closing of the sunroof.

The suspension drive unit 759 may perform electronic control of a suspension apparatus in the vehicle 700. For example, when a road surface is uneven, the suspension drive unit 759 may control the suspension apparatus to attenuate vibration of the vehicle 700. The suspension drive unit 759 may receive a suspension control signal from the steering input apparatus 100. The suspension drive unit 759 may control the suspension apparatus according to the received suspension control signal.

The memory 730 is electrically connected to the controller 770. The memory 730 may store basic data for each unit, control data for controlling operation of each unit, and input/output data. When implemented through hardware, the memory 730 may include various storage devices such as a ROM, RAM, EPROM, flash drive, and hard drive. The memory 730 may store various kinds of data for overall operation of the vehicle 700 including a program for processing or controlling operation of the controller 770.

The interface unit 780 may serve as a path between the vehicle 700 and various kinds of external devices connected thereto. For example, the interface unit 780 may be provided with a port connectable to the mobile terminal 600, thus being connected to the mobile terminal 600 through the port. In this case, the interface unit 780 may exchange data with the mobile terminal 600.

The interface unit 780 may also serve as a path through which electrical energy is supplied to the mobile terminal 600 connected thereto. If the mobile terminal 600 is electrically connected to the interface unit 780, the interface unit 780 is controlled by the controller 770 to provide the mobile terminal 600 with electrical energy supplied from the power supply 790.

The controller 770 may control overall operations of the respective units in the vehicle 700. The controller 770 may be called an electronic control unit (ECU).

The controller 770 may be implemented as hardware using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units for performing other functions.

The power supply 790 may be controlled by the controller 770 to supply electric power necessary for operation of respective constituents. In particular, the power supply 790 may receive power from, for example, a battery in the vehicle.

The steering input apparatus 100 may exchange data with the controller 770. Various kinds of information, data or a control signal generated from the steering input apparatus 100 may be output to the controller 770. The steering input apparatus 100 may be the steering input apparatus described above with reference to FIGS. 1 to 3.

The display apparatus 400 may exchange data with the controller 770. The controller 770 may receive navigation information from the display apparatus 400 or a separate navigation apparatus. Herein, the navigation information may include destination information, route information according to the destination, map information, or vehicle location information, wherein the map information and the vehicle location information are related to traveling of the vehicle.

Figure 5A:
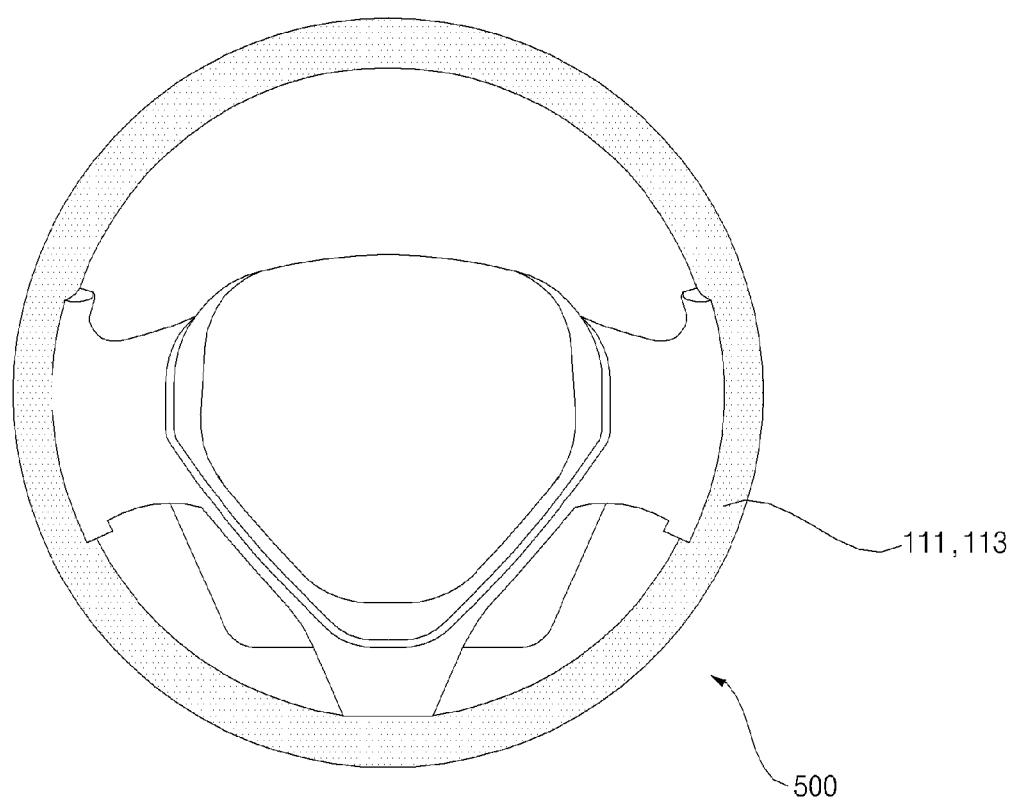
FIGS. 5A to 5C are diagrams illustrating examples of a grip position sensor and a grip pressure sensor.
Figure 5B:
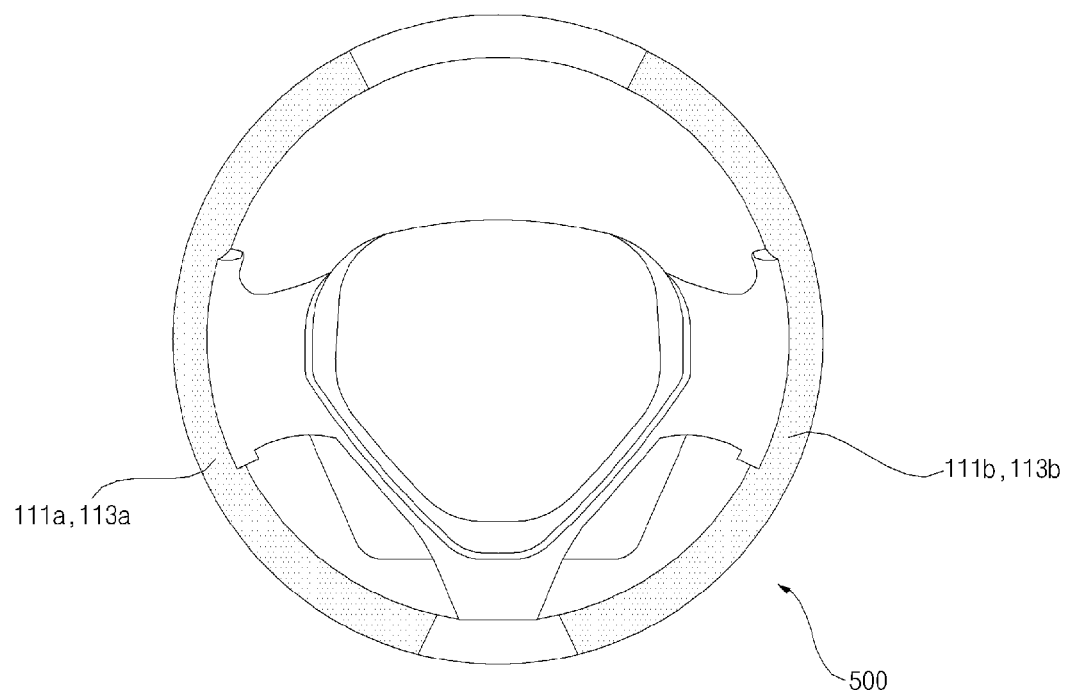
Figure 5C:
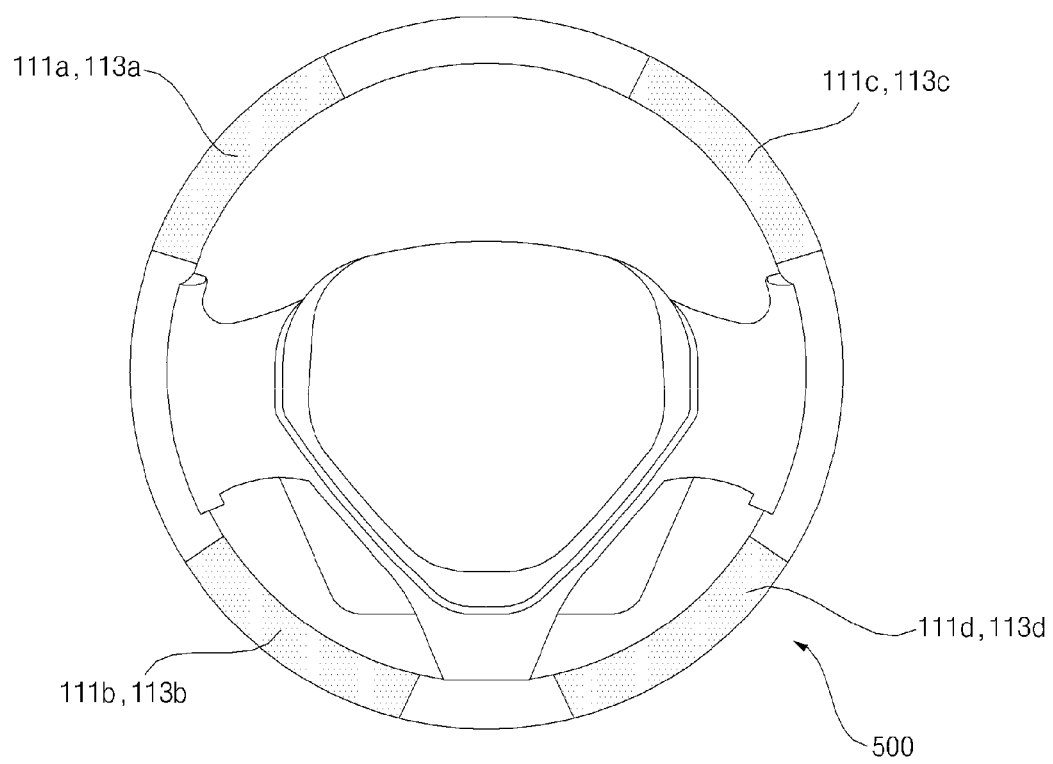

FIG. 5A to 5C are diagrams illustrating examples of a grip position sensor and a grip pressure sensor. The grip position sensor 111 may include at least one touch sensor. The touch sensor may be disposed in at least one area of the steering wheel rim. Preferably, the touch sensor is disposed in an area in which the user's hands are positioned to provide a steering input in the region of the rim of the steering wheel during driving.

The grip pressure sensor 113 may include at least one pressure sensor. The pressure sensor may be disposed in at least one area of the steering wheel rim. Preferably, the pressure sensor is disposed in an area in which the user's hands are positioned to provide a steering input in the region of the rim of the steering wheel during driving.

As shown in FIG. 5A, the touch sensor included in the grip position sensor 111 may be disposed over the whole region of the steering wheel rim 500.

The pressure sensor included in the grip pressure sensor 113 may be disposed over the whole region of the steering wheel rim 500.

According to some implementations, the touch sensor and the pressure sensor may be integrally modularized.

When the user grips one area of the steering wheel rim 500, the touch sensor and the pressure sensor which are disposed over the whole region of the steering wheel rim 500 may sense a grip position and a grip pressure.

As shown in FIG. 5B, the touch sensor included in the grip position sensor 111 may include a first touch sensor 111a disposed over a part of the steering wheel rim 500 from the upper left end to the lower left end and a second touch sensor 111b disposed over a part of the steering wheel rim 500 from the upper right end to the lower right end.

The pressure sensor included in the grip pressure sensor 113 may include a first pressure sensor 113a disposed over a part of the steering wheel rim 500 from the upper left end to the lower left end and a second pressure sensor disposed over a part of the steering wheel rim 500 from the upper right end to the lower right end.

As shown in FIG. 5C, the touch sensor included in the grip position sensor 111 may include a first touch sensor 111a disposed at the upper left end of the steering wheel rim 500, a second touch sensor 111b disposed at the lower left end of the steering wheel rim 500, a third touch sensor 111c disposed at the upper right end of the steering wheel rim 500, and a fourth touch sensor 111d disposed at the lower right end of the steering wheel rim 500.

The pressure sensor included in the grip pressure sensor 113 may include a first pressure sensor 113a disposed at the upper left end of the steering wheel rim 500, a second pressure sensor 113b disposed at the lower left end of the steering wheel rim 500, a third pressure sensor 113c disposed at the upper right end of the steering wheel rim 500, and a fourth pressure sensor 113d disposed at the lower right end of the steering wheel rim 500.

FIG. 6A to 6F are diagrams illustrating examples of an operation of outputting grip guide information based on the grip position.

The processor 170 may receive grip position information from the grip position sensor 111. The processor 170 may determine whether the grip position is improper for the driving situation, based on the grip position information received from the grip position sensor 111.

Figure 6A:
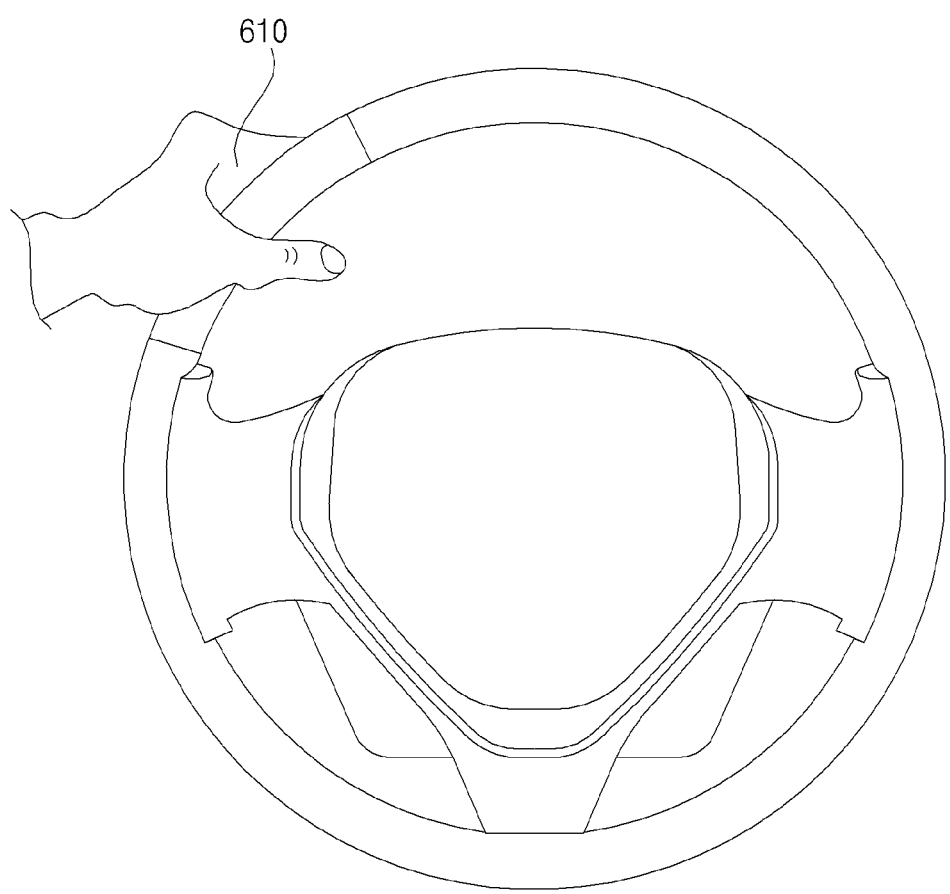
FIGS. 6A to 6F are diagrams illustrating examples of an operation of outputting grip guide information based on the grip position.
Figure 6B:
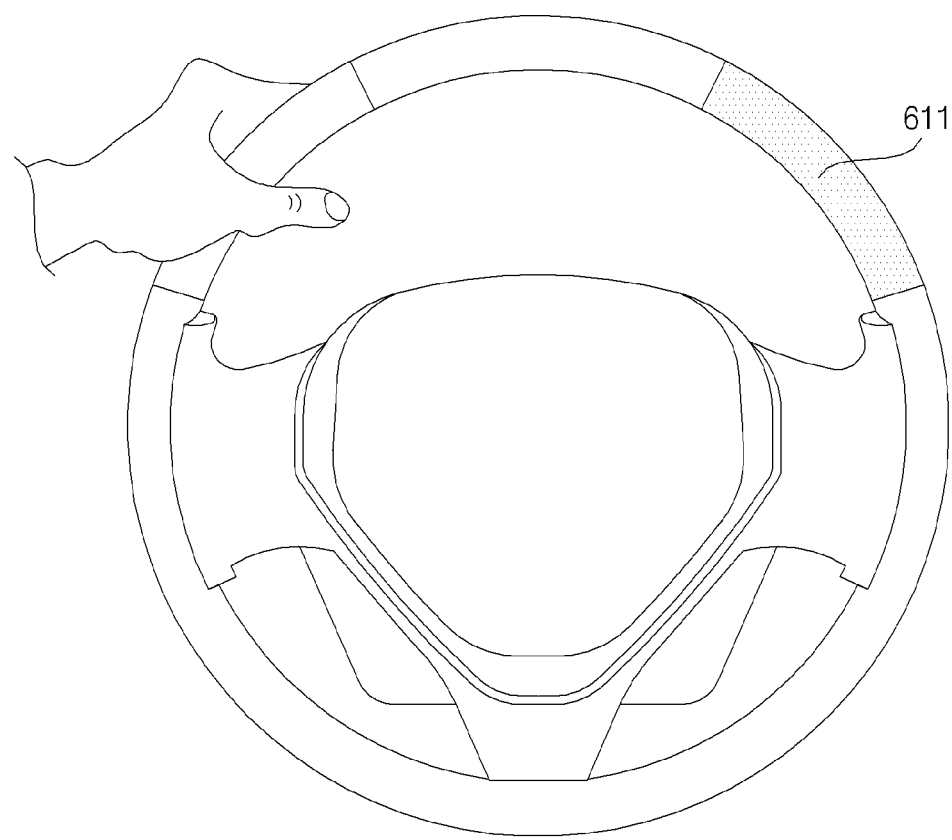

If a grip of the left hand 610 is sensed, but a grip of the right hand is not sensed during driving as shown in FIG. 6A, the processor 170 may output right hand grip guide information 611 in a region of the steering wheel rim in which the grip of the right hand is required as shown in FIG. 6B.

Figure 6C:
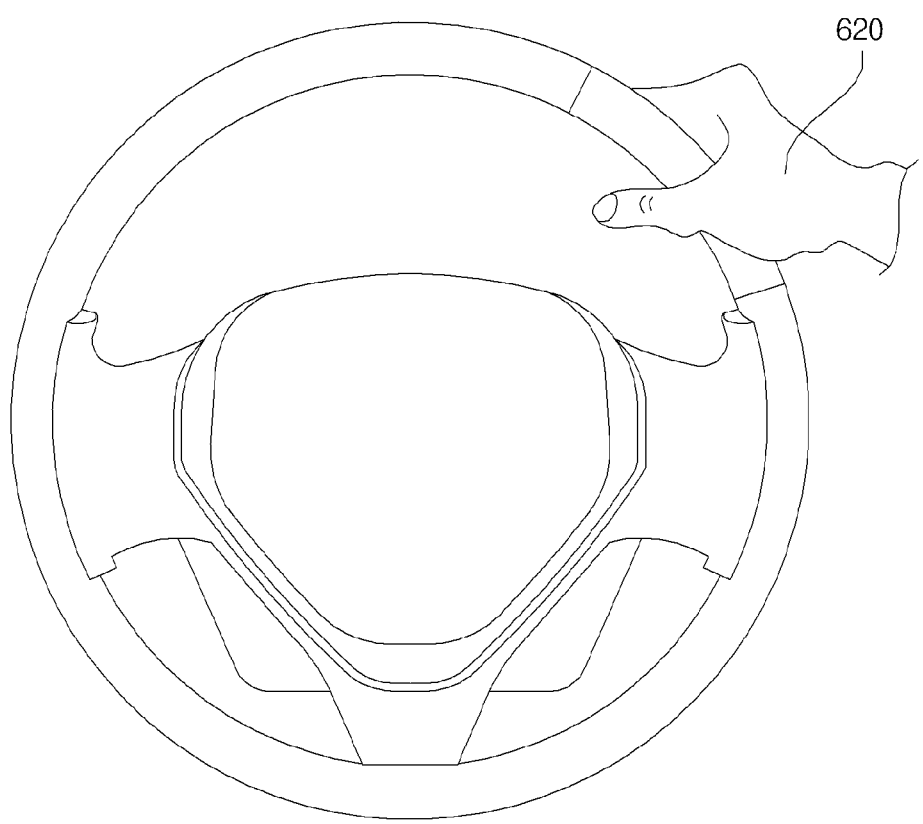
Figure 6D:
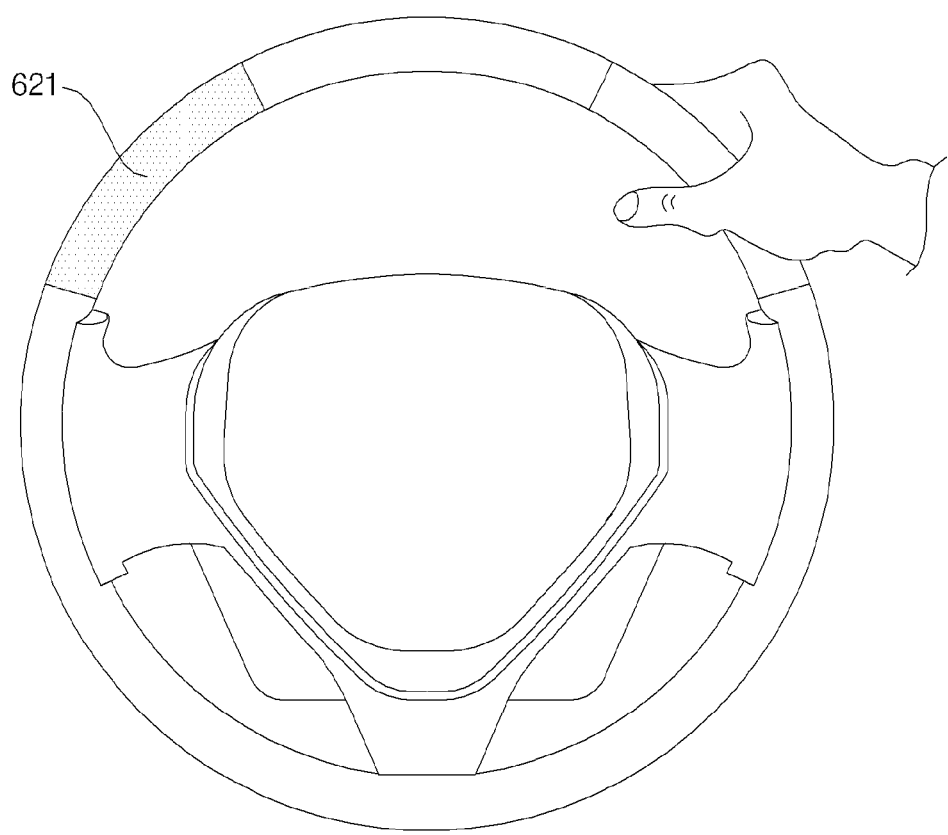

If a grip of the right hand 620 is sensed, but a grip of the left hand is not sensed during driving as shown in FIG. 6C, the processor 170 may be output left hand grip guide information 621 in a region in which the grip of the left hand is required as shown in FIG. 6D.

Figure 6E:
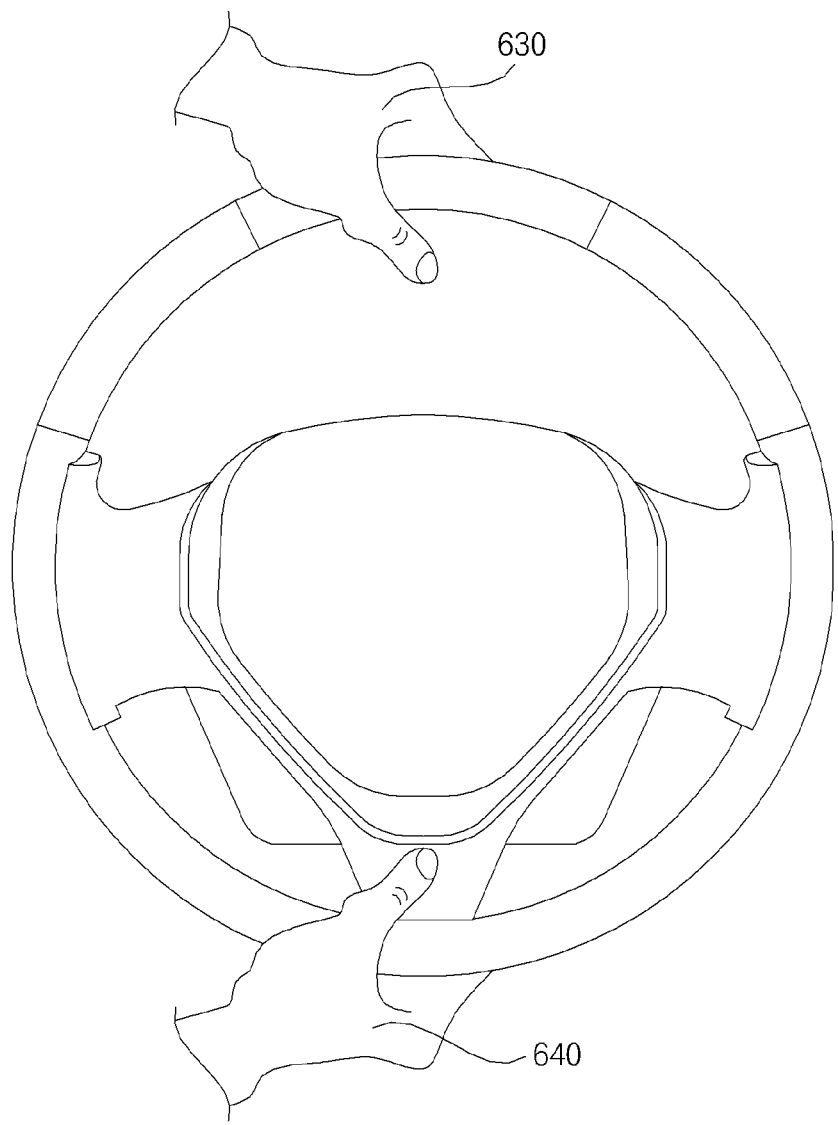
Figure 6F:
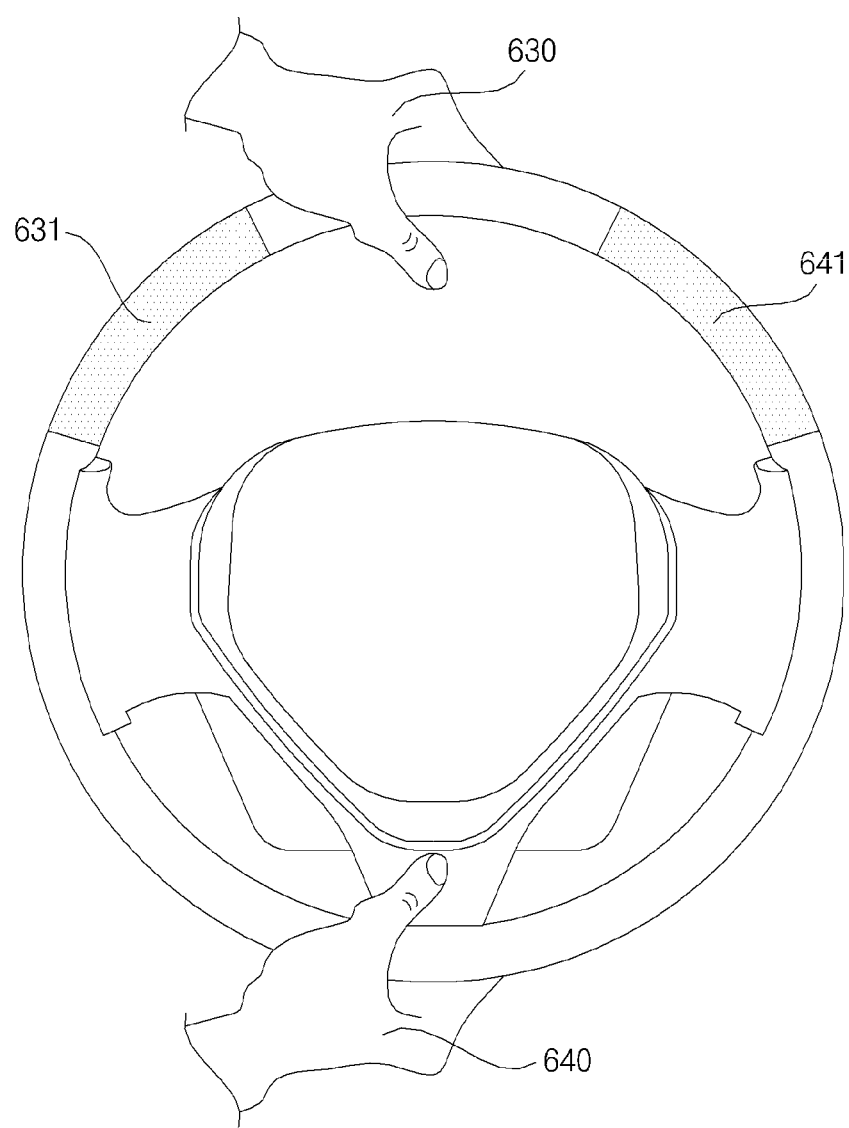

If the grip of the left hand 630 or the right hand 640 is sensed in an improper region (e.g., an upper end region or lower end region) of the steering wheel rim during driving as shown in FIG. 6E, the processor 170 may output both-hand grip guide information 631, 641 in a region of the steering wheel rim in which grip of the left hand or the right hand is required.

Driving alert stations will be described in detail with reference to FIG. 14 later.

FIG. 7A to 7D are diagrams illustrating examples of an operation of outputting grip guide information in a curve entry section.

If grip of a first hand is sensed, but grip of a second hand is not sensed, the processor 170 may control light emitters disposed in different regions to emit light according to whether the vehicle travels straight forward or along a curve.

The processor 170 may receive, through the interface unit 130, information about whether a road in front of the vehicle is a straight road or a curved road. The processor 170 may control light emitters disposed in different regions to emit light according to whether the road in front of the vehicle is a straight road or a curved road, based on the received information.

Figure 7A:
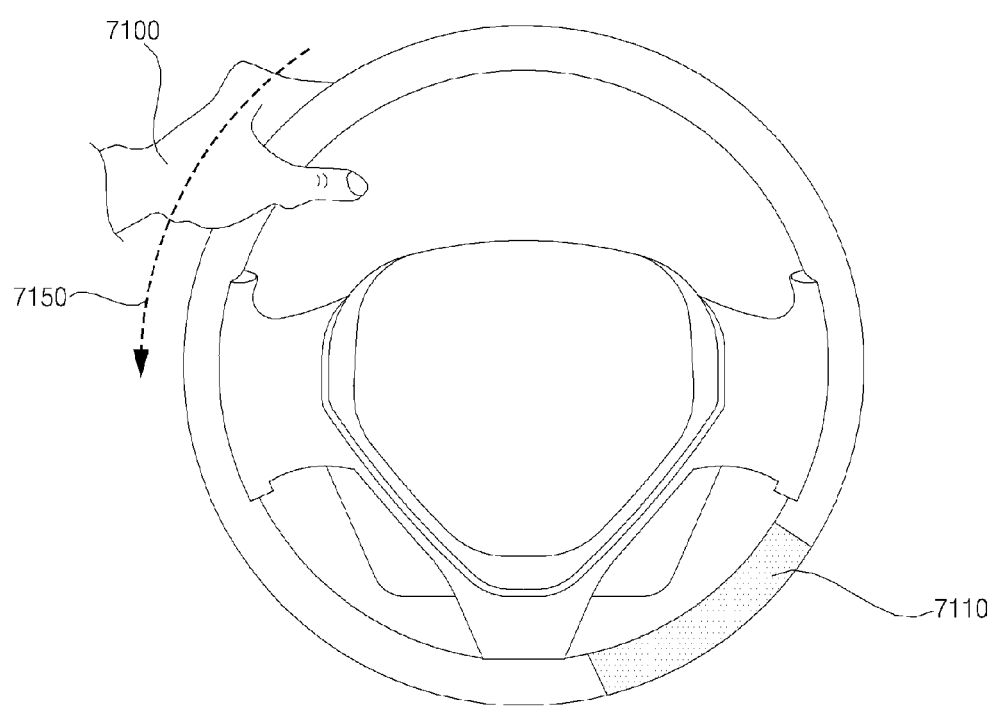
FIGS. 7A to 7D are diagrams illustrating examples of an operation of outputting grip guide information in a curve entry section.

When a grip of the left hand 7200 is sensed, but a grip of the right hand is not sensed in a leftward curve entry section or left turn section as shown in FIG. 7A, the processor 170 may output grip guide information 7110 in a region corresponding to the curvature of the leftward curve in which the grip of the right hand is required. For example, the processor 170 may control a light emitter disposed in the lower right end region to emit light. In the leftward curve entry section or left turn section, the driver should provide a steering input corresponding to the left turn by rotating the steering wheel in the counterclockwise direction 7150. In this case, the processor 170 may facilitate rotation of the steering wheel by outputting the grip guide information 7110 in the region corresponding to the curvature of the leftward curve in which the grip of the right hand is required.

Figure 7B:
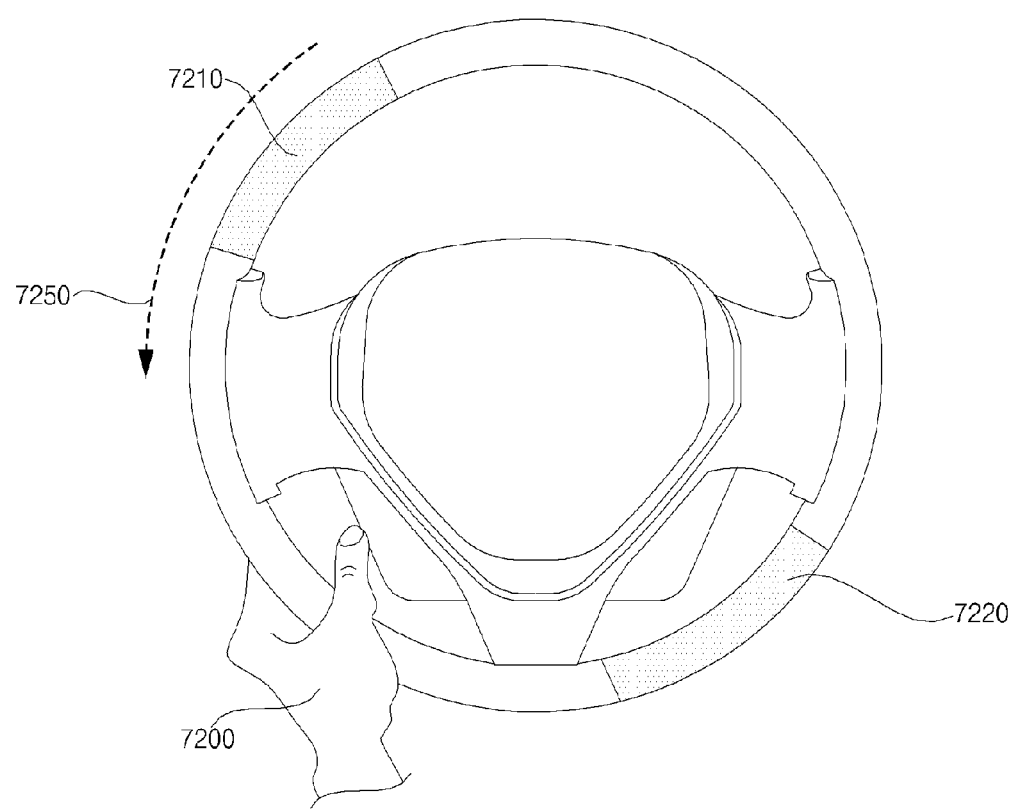

When grip of the left hand 7200 is sensed in an improper region, and grip of the right hand is not sensed in a leftward curve entry section or left turn section as shown in FIG. 7B, the processor 170 may output grip guide information 7210, 7220 in regions corresponding to the curvature of the leftward curve in which grips of the left hand and the right hand are required. For example, the processor 170 may control light emitters disposed in the upper left end region and the lower right end region to emit light. In the leftward curve entry section or left turn section, the driver should provide steering input corresponding to the left turn by rotating the steering wheel in the counterclockwise direction 7250. In this case, the processor 170 may facilitate rotation of the steering wheel by outputting the grip guide information 7210, 7220 in the regions corresponding to the curvature of the leftward curve in which grips of the left hand and the right hand are required.

Figure 7C:
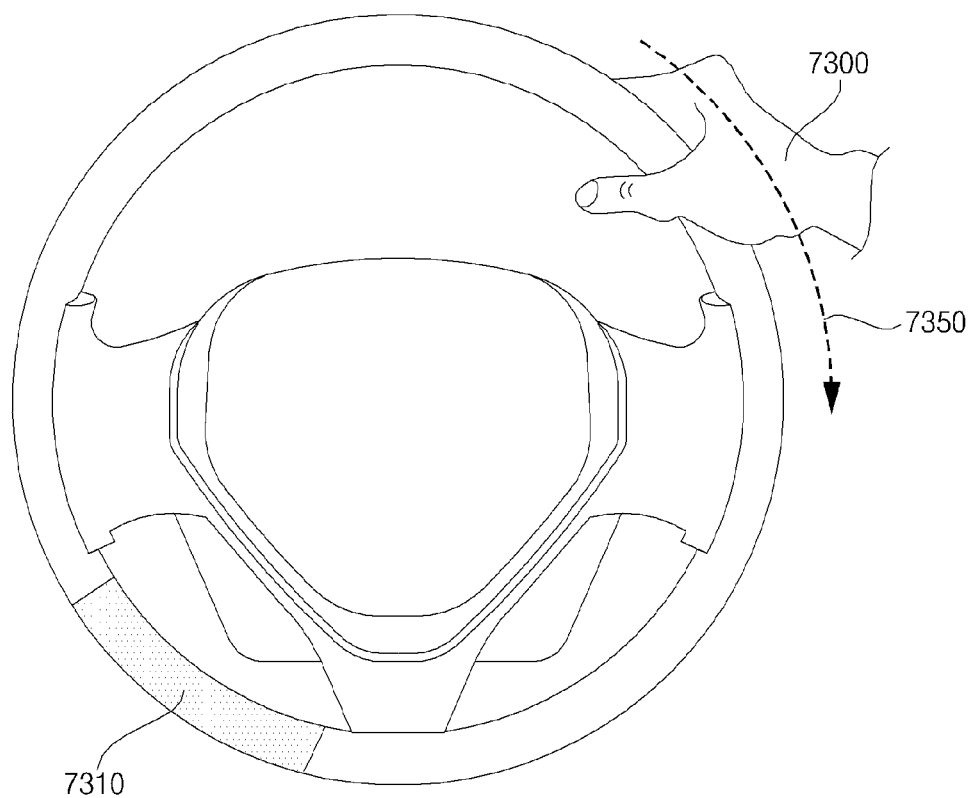

When grip of the right hand 7300 is sensed, but grip of the left hand is not sensed in a rightward curve entry section or right turn section as shown in FIG. 7C, the processor 170 may output grip guide information 7310 in a region corresponding to the curvature of the rightward curve in which grip of the left hand is required. For example, the processor 170 may control a light emitter disposed in the lower left end region to emit light. In the rightward curve entry section or right turn section, the driver should provide a steering input corresponding to the right turn by rotating the steering wheel in the clockwise direction 7350. In this case, the processor 170 may facilitate rotation of the steering wheel by outputting the grip guide information 7310 in the region corresponding to the curvature of the rightward curve in which the grip of the left hand is required.

Figure 7D:
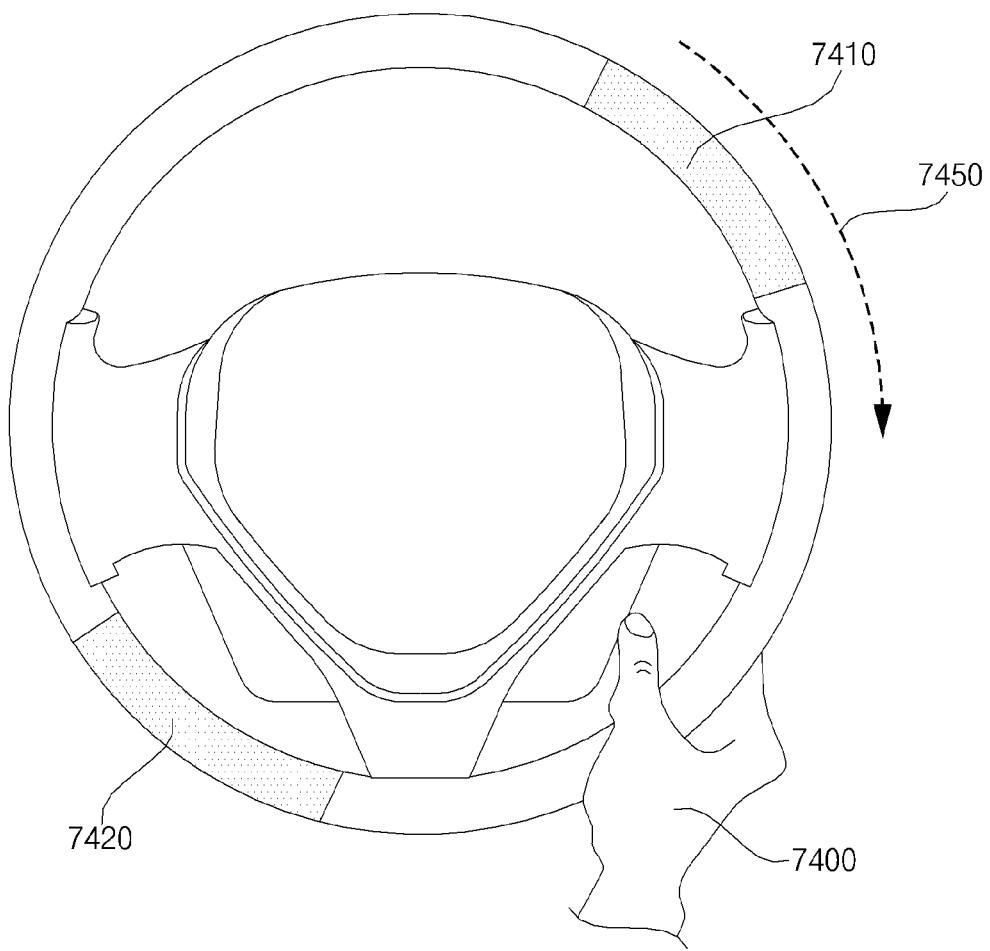

When grip of the right hand 7400 is sensed in an improper region, and grip of the left hand is not sensed in a rightward curve entry section or right turn section as shown in FIG. 7D, the processor 170 may output grip guide information 7410, 7420 in regions corresponding to the curvature of the rightward curve in which grips of the right hand and the left hand are required. For example, the processor 170 may control light emitters disposed in the upper right end region and the lower left end region to emit light. In the rightward curve entry section or right turn section, the driver should provide a steering input corresponding to the right turn by rotating the steering wheel in the clockwise direction 7450. In this case, the processor 170 may facilitate rotation of the steering wheel by outputting the grip guide information 7410, 7420 in the regions corresponding to the curvature of the rightward curve in which grips of the right hand and the left hand are required.

Figure 8A:
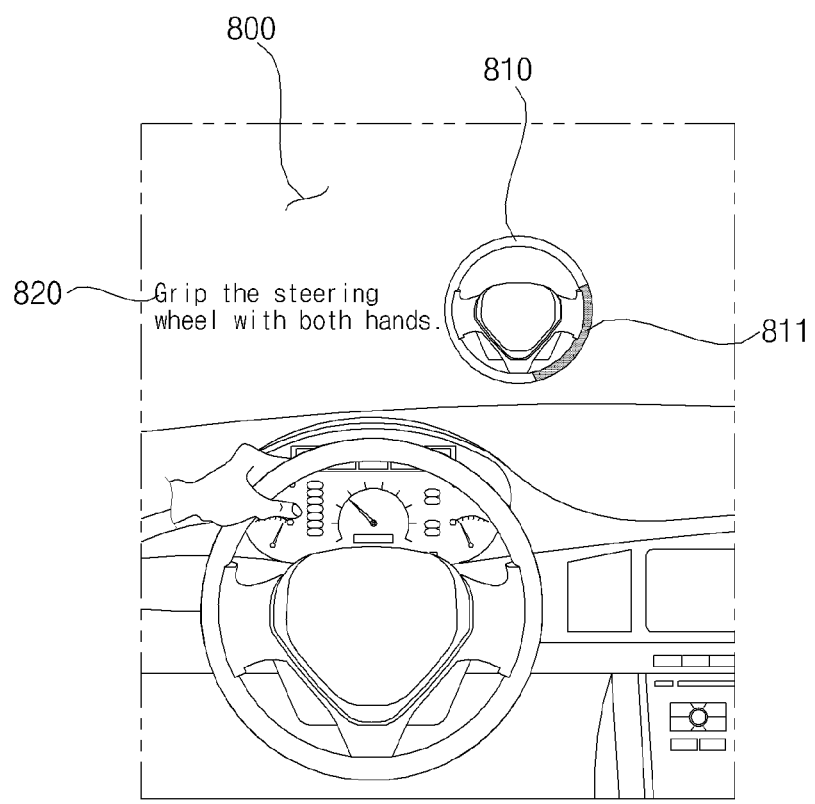
FIGS. 8A to 8C are diagrams illustrating various examples of a grip guide output unit.
Figure 8B:
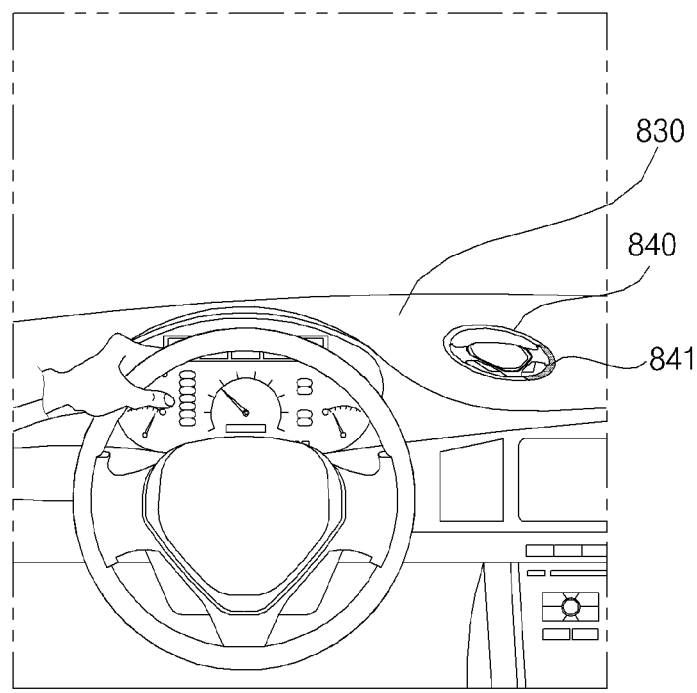
Figure 8C:
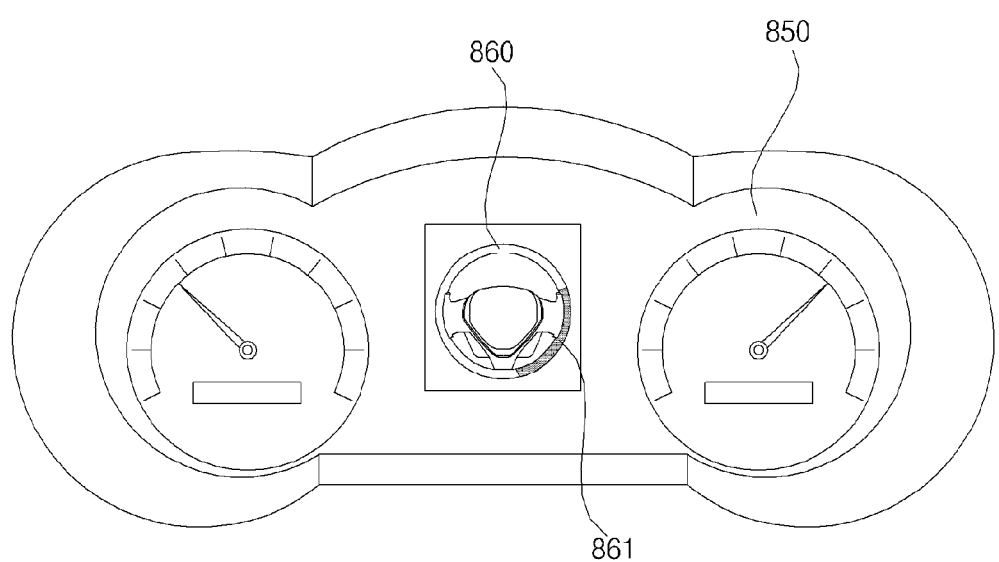

FIGS. 8A to 8C are diagrams illustrating various examples of a grip guide output unit.

The grip guide output unit 150 may be disposed on the steering wheel rim as illustrated in FIG. 6A to 7D. The grip guide output unit 150 may include at least one light emitter, and may output grip guide information through emission of light from the light emitter.

As shown in FIG. 8A, the grip guide output unit 150 may be disposed in one region of a windshield 800. The grip guide output unit 150 may include a display. The display may be implemented by a transparent display, and disposed near the windshield 800. Alternatively, the display may include a projection module and thus project an image onto the windshield 800.

While a steering wheel image 810 is displayed in one region of the windshield 800, the processor 170 may display a grip guide image 811 in a region of the steering wheel rim image 810 in which gripping of the steering wheel is required.

The processor 170 may display content 820 for guiding a proper grip position in one region of the windshield 800.

As shown in FIG. 8B, the grip guide output unit 150 may be disposed in one region of the dashboard 830. The grip guide output unit 150 may include a display. The display may be disposed on the dashboard.

While a steering wheel image 840 is displayed in one region of the dashboard 830, the processor 170 may display a grip guide image 841 in a region of the steering wheel image 840 in which a grip on the steering wheel is required.

According to an implementation, the steering wheel image 840 and the grip guide image 841 may be displayed on the dashboard 830. In this case, the steering wheel image 840 and the grip guide image 841 may be focused on the windshield. The user may look at the focused images on the windshield and recognize the steering wheel image 840 and the grip guide image 841. In this case, the user may check the grip guide information while looking forward of the vehicle during driving.

As shown in FIG. 8C, the grip guide output unit 150 may be disposed in one region of a cluster 850.

While a steering wheel image 860 is displayed in one region of the cluster 850, the processor 170 may display a grip guide image 861 in a region of the steering wheel image 860 in which gripping of the steering wheel is required.

As the grip guide information is displayed on the cluster as described above, the user may check grip guide information while checking various kinds of information displayed on the cluster.

Figure 9:
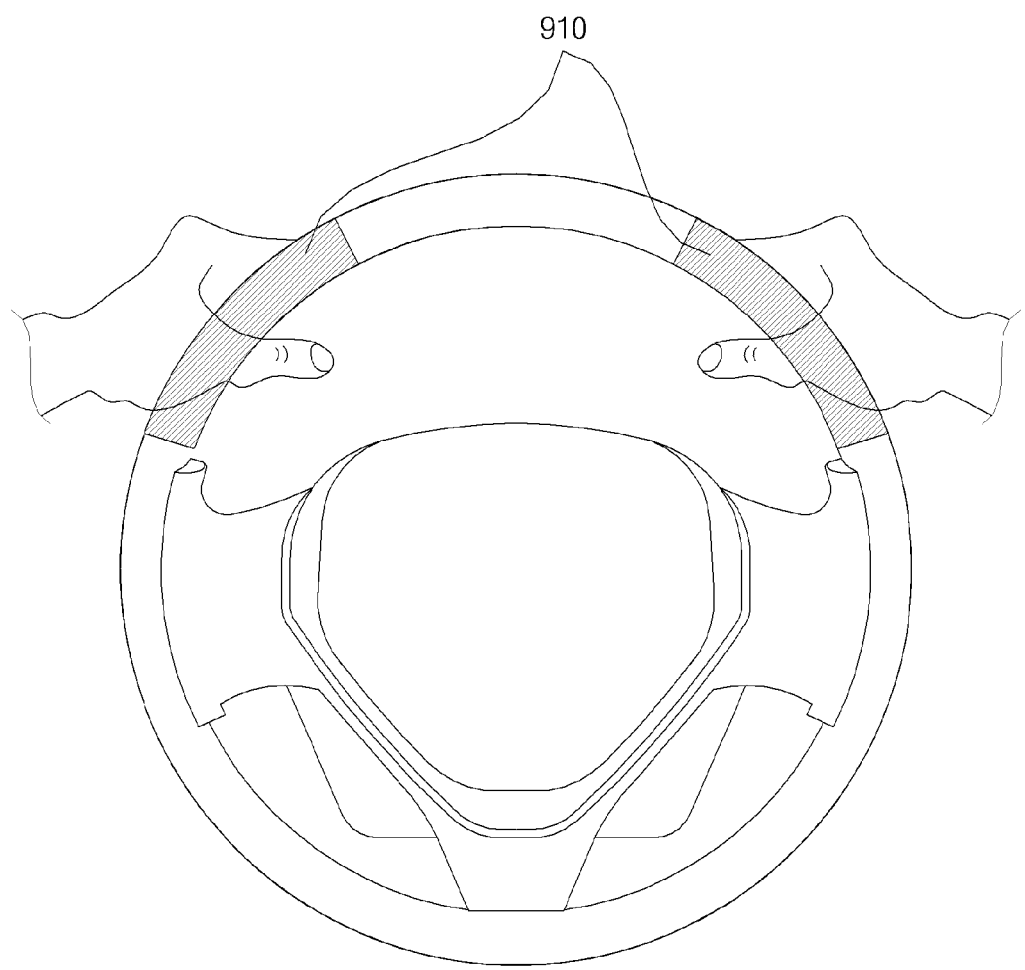
FIGS. 9 and 10 are diagrams illustrating examples of an operation of outputting grip guide information based on the grip pressure.
Figure 10:
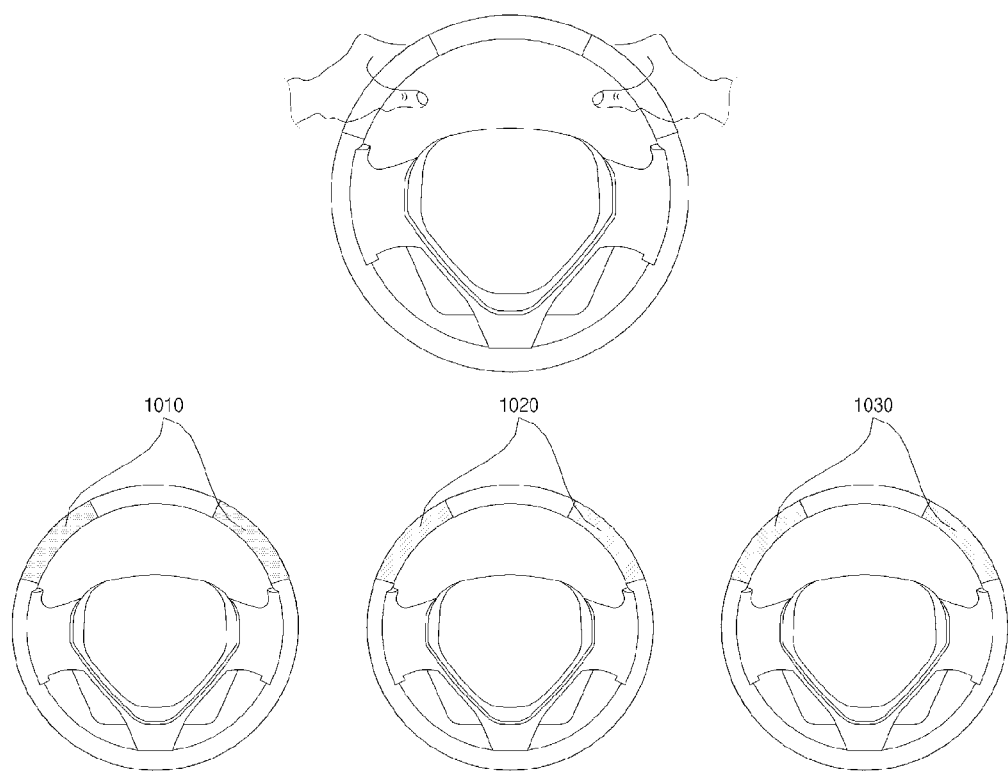

FIGS. 9 and 10 are diagrams illustrating examples of an operation of outputting grip guide information based on the grip pressure.

Referring to FIG. 9, the processor 170 may receive grip pressure information from the grip pressure sensor 113. The processor 170 may determine, based on the grip pressure information received from the grip pressure sensor 113, whether the grip pressure is improper for the driving situation.

If the grip pressure sensed through the grip pressure sensor 113 is less than or equal to a reference pressure stored in the memory 140, the processor 170 may output grip guide information.

For example, if the grip pressure is less than or equal to the reference pressure, the processor 170 may control a light emitter 920 disposed in a region in which grip of a user hand is required, such that the light emitter 920 emits light of a second color. If the gripping force applied to the steering wheel rim by the user is weak, the user may lose grip on the steering wheel rim in a certain driving situation, which may result in an accident. As the user is guided to properly grip the steering wheel rim according to the driving situation, an accident may be prevented.

The processor 170 may control a grip guide output corresponding to a grip position and a grip guide output corresponding to a grip pressure differently. For example, the processor 170 may control a light emitter to emit light of a first color in outputting a grip guide corresponding to a grip position, and control the light emitter to emit light of a second color in outputting a grip guide corresponding to a grip pressure.

The reference pressure may be set based on a user grip pressure received through the grip pressure sensor 113 in the grip pressure reference setting mode.

Referring to FIG. 10, the processor 170 may control the intensity or color of the emitted light according to the sensed grip pressure.

The processor 170 may assign levels to sensed grip pressures and perform a control operation to output light of an intensity or color corresponding to a given level.

If the grip pressure is less than or equal to a reference pressure and corresponds to a first level section, the processor 170 may control the light emitter to emit light with a first intensity or in a first color 1010.

If the grip pressure is less than or equal to the reference pressure and corresponds to a second level section, the processor 170 may control the light emitter to emit light with a second intensity or of a second color 1020.

If the grip pressure is less than or equal to the reference pressure and corresponds to a third level section, the processor 170 may control the light emitter to emit light with a third intensity or of a third color 1030. By assigning levels to grip pressures and outputting grip guide information according to a grip pressure assigned a level, accurate information may be delivered to the user, and a proper grip pressure may be specifically signaled to the user.

Figure 11:
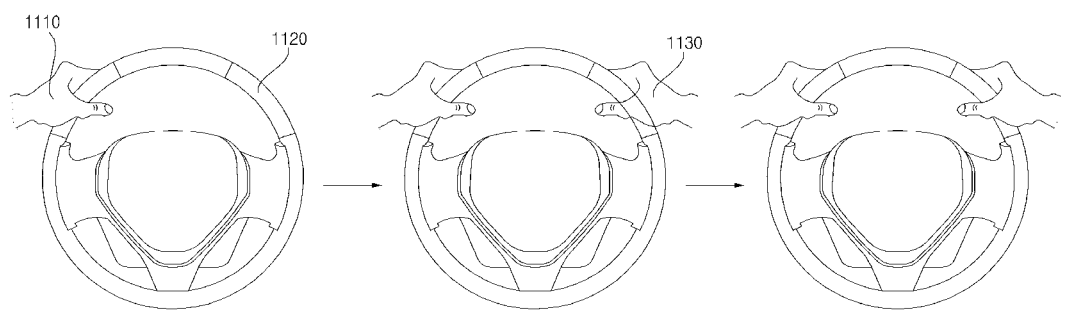
FIG. 11 is a diagram illustrating an example of an operation of stopping output of grip guide information.

FIG. 11 is a diagram illustrating an example of an operation of stopping output of grip guide information.

Referring to FIG. 11, if a grip of the left hand 1110 is sensed, but a grip of the right hand is not sensed during driving, the processor 170 may output right hand grip guide information 1120 in a region in which grip of the right hand is required.

Thereafter, when grip of the right hand 1130 according to the grip guide information is sensed, the processor 170 may stop outputting the right hand grip guide information 1120.

Figure 12:
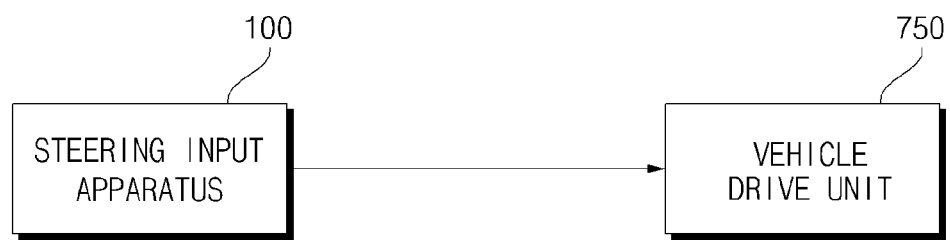
FIG. 12 is a diagram illustrating an example of an operation of providing a vehicle control signal when a proper grip according to the grip guide information is not sensed.

FIG. 12 is a diagram illustrating an example of an operation of providing a vehicle control signal when a proper grip according to the grip guide information is not sensed.

Referring to FIG. 12, if the grip guide information is output, but a proper grip according to the grip guide information is not sensed, the processor 170 may provide a signal for control of driving of the vehicle through the interface unit 130.

If a dangerous situation is sensed without proper grip according to the grip guide information implemented, the processor 170 may provide a brake control signal to the brake drive unit 753. If the brake is applied according to the brake control signal, the vehicle 700 may avoid the dangerous situation.

If a dangerous situation is sensed without a proper grip according to the grip guide information implemented, the processor 170 may provide a steering control signal to the steering drive unit 752. If the steering operation is implemented according to the steering control signal, the vehicle 700 may avoid the dangerous situation.

The dangerous situation may be a situation in which collision with another vehicle, a two-wheeled vehicle, a pedestrian or a structure is predicted.

According to an implementation, if the grip guide information is output, but a proper grip according to the grip guide information is not sensed, the processor 170 may provide an acceleration control signal to the power source drive unit 751 to avoid another vehicle approaching one side of the driver's vehicle at an intersection.

Figure 13:
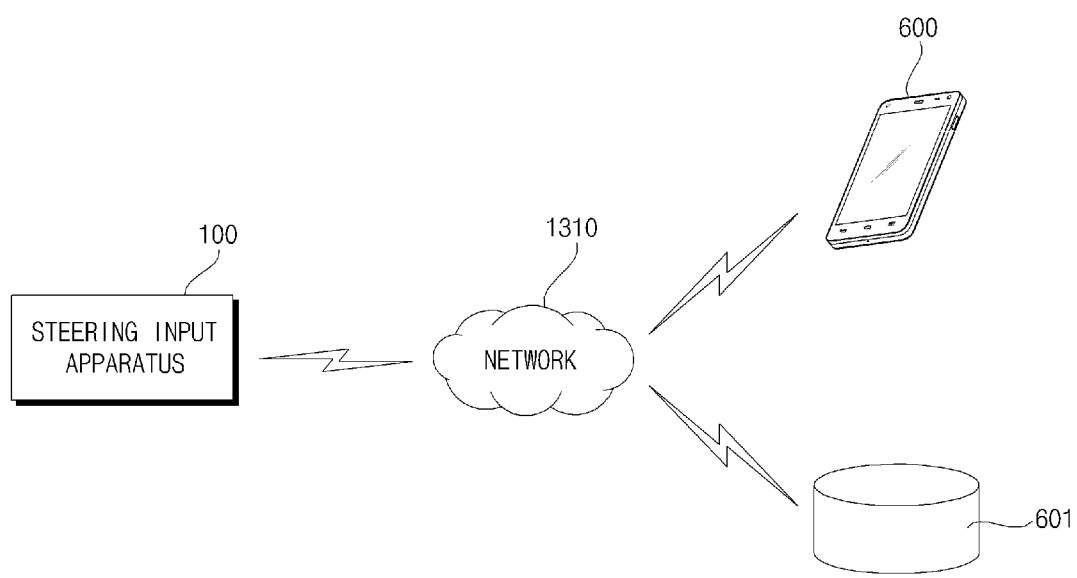
FIG. 13 is a diagrams illustrating an example of an operation of providing grip position information to other devices when a proper grip according to the grip guide information is not sensed.

FIG. 13 is a diagram illustrating an example of an operation of providing grip position information to other devices when a proper grip according to the grip guide information is not sensed.

Referring to FIG. 13, if the grip guide information is output, but a proper grip according to the grip guide information is not sensed, the processor 170 may provide the grip guide information to other devices through the communication unit 120.

For example, when a driver who recently obtained a driver's license drives the vehicle 700 which is property of a parent of the driver, if a proper grip according to the grip guide information is not sensed, the processor 170 may provide the grip position information about the driver to the mobile terminal 600 of the parent through the communication unit 120.

For example, if a proper grip according to the grip guide information is not sensed, the processor 170 may provide the grip position information about the driver to a traffic control center server 601 through the communication unit 120. In this case, the owner of the vehicle 700 may be fined based on the information collected in the traffic control center server 601.

Figure 14:
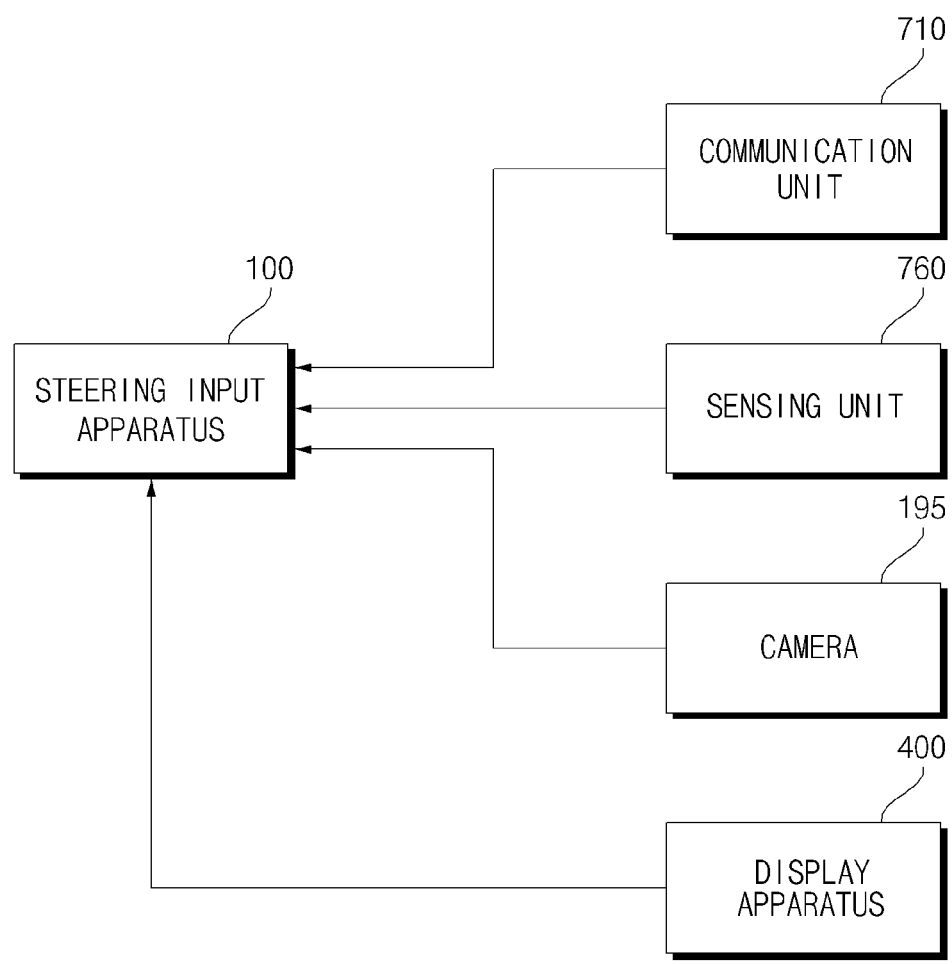
FIG. 14 is a diagram illustrating an example of an operation of receiving driving alert situation information.

FIG. 14 is a diagram illustrating an example of an operation of receiving driving alert situation information.

Referring to FIG. 14, the processor 170 may receive driving alert situation information from the communication unit 710, the sensing unit 760 and the camera 195 of the vehicle 700 through the interface unit 130.

The steering input apparatus 100 may receive weather information, driving road information and traffic light information from the communication unit 710.

The steering input apparatus 100 may receive vehicle speed information, surrounding illumination information and tire pressure information from the sensing unit 760.

The steering input apparatus 100 may receive road surface condition information, object information and driver attentiveness information from the camera 195.

The steering input apparatus 100 may receive map information and driving road information from the display apparatus 400.

The driving alert situation information may be generated based on at least one of the weather information, driving road information, traffic light information, vehicle speed information, surrounding illumination information, tire pressure information, road surface condition information, object information, driver attentiveness information and map information. The driving alert situation information may be situation information of which the user should be alerted during driving.

For example, a situation in which driving is performed in the rain or snow may be a driving alert situation.

For example, a situation in which driving is performed in a curve section, a left turn section, or a right turn section may be a driving alert situation.

For example, a situation in which driving is performed when the traffic light changes from the drive signal to the stop signal may be a driving alert situation.

For example, a situation in which driving is performed at a speed higher than or equal to a reference speed may be a driving alert situation.

For example, a situation in which driving is performed when the surrounding illumination level is lower than or equal to a reference illumination level (e.g., night driving or driving through a tunnel) may be a driving alert situation.

For example, a situation in which driving is performed when the tire pressure is less than or equal to a reference pressure may be a driving alert situation.

For example, a situation in which driving is performed on a road having multiple raised and lowered parts or sinkholes may be a driving alert situation.

For example, a situation in which driving is performed in a complex section or with the distance to an object reduced below a reference distance may be a driving alert situation.

For example, a situation in which driving is performed with the driver's attentiveness lowered due to manipulation of an air conditioning system or a stereo system may be a driving alert situation.

For example, a situation in which driving is performed in a section of frequent accidents on a map may be a driving alert situation.

Figure 15:
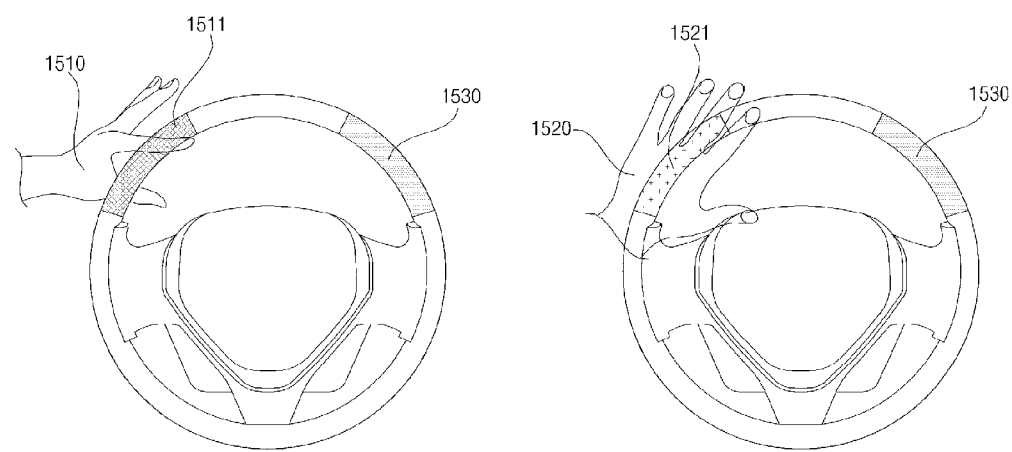
FIG. 15 is a diagram illustrating an example of an operation of outputting grip guide information based on the grip area.

FIG. 15 is a diagram illustrating an example of an operation of outputting grip guide information based on the grip area.

Referring to FIG. 15, the processor 170 may calculate a grip area based on the grip position information received from the grip position sensor 111. If the grip position sensor 111 includes a touch sensor, the grip area may be calculated based on the area of a part of the touch sensor that is touched.

If the grip area is less than or equal to a reference area, the processor 170 may output grip guide information. For example, if the grip area is less than the reference area, the processor 170 may control a light emitter disposed in a region in which a grip of the user's hand is required, such that the light emitter emits light of a third color. For example, the reference area may be determined based on an area of the steering wheel which the palm or fingers of an adult gripping the steering wheel rim contact.

If the driver does not grip the steering wheel rim with the right hand, the processor 170 may output right hand grip guide information 1530 in a region of the steering wheel rim in which grip of the right hand is required. The processor 170 may control a light emitter disposed at an upper right end of the steering wheel rim to emit light of a first color.

If only fingers of the left hand contact the steering wheel rim (1510), the processor 170 may determine that the grip area is less than or equal to a reference area. In this case, the processor 170 may output guide information 1511 for guiding a proper grip in a region of the steering wheel rim in which a grip of the left hand is required. The processor 170 may control a light emitter disposed at an upper left end of the steering wheel rim to emit light of a third color.

If only the palm of the left hand contacts the steering wheel rim (1520), the processor 170 may determine that the grip area is less than or equal to a reference area. In this case, the processor 170 may output guide information 1521 for guiding a proper grip in a region of the steering wheel rim in which the grip of the left hand is required. The processor 170 may control the light emitter disposed at the upper left end of the steering wheel rim to emit light of a fourth color.

The processor 170 may control the intensity or color of light emitted from the light emitter of the grip guide output unit 150 according to the grip area.

As the processor 170 controls output of grip guide information corresponding to a non-grip state and output of grip guide information corresponding to a grip area differently as described above, the user may specifically recognize an improper grip.

Figure 16:
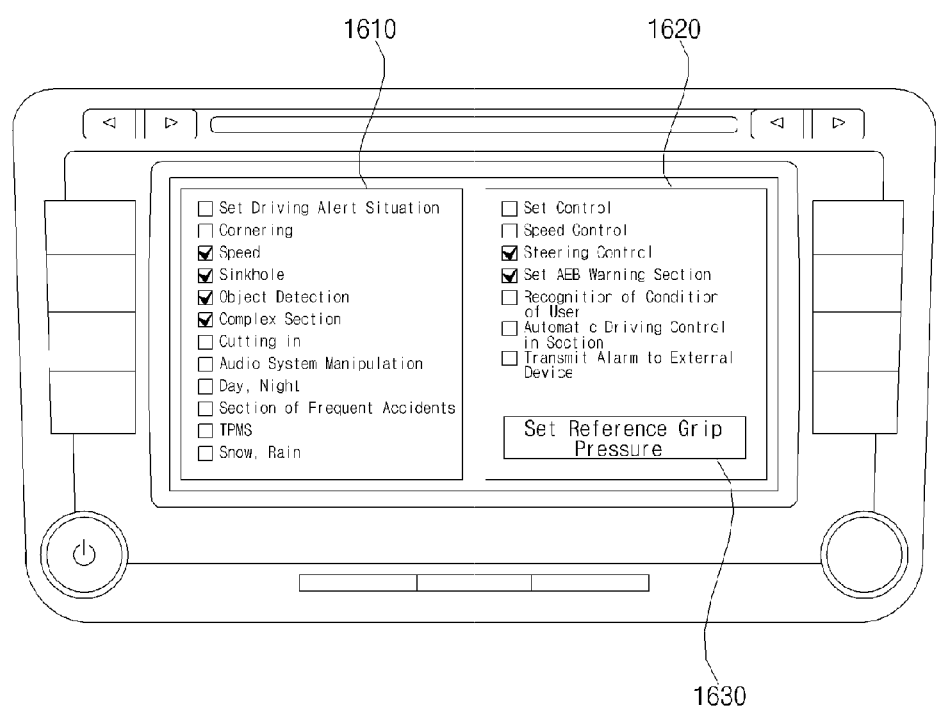
FIG. 16 is a diagram illustrating an example of an operation of setting a vehicle steering input apparatus.

FIG. 16 is a diagram illustrating an example of an operation of setting a vehicle steering input apparatus.

Referring to FIG. 16, the processor 170 may enter a setting mode according to user input.

In the setting mode, the processor 170 may perform, according to user input, setting of a specific driving alert situation 1610 for performing grip position sensing or grip pressure sensing.

The processor 170 may select at least one of a plurality of driving alert situations. In the selected driving alert situation, the processor 170 may perform an operation corresponding to a sensed grip position or grip pressure.

The plurality of driving alert situations may include situations such as cornering, a driving speed, sinkhole detection, object detection, a complex section, unsafe lane change, manipulation of a stereo system, night driving, a section of frequent accidents, tire pressure, snow, and rain.

In the setting mode, the processor 170 may perform setting of a control operation 1620 according to user input.

The processor 170 may select at least one of a plurality of control operations. In a driving alert situation, the processor 170 may perform a selected control operation according to a sensed grip position or grip pressure.

The plurality of control operations may include speed control, steering control, setting of an AEB warning section, recognition of the condition of the user, autonomous driving in a section, and transmission of a notice to an external device.

When Set Reference Grip Pressure 1630 is selected according to a user input, the processor 170 may enter a grip pressure reference setting mode. The processor 170 may sense a reference grip pressure of a user through the grip pressure sensor 113. The reference grip pressure may be stored in the memory 140.

Figure 17:
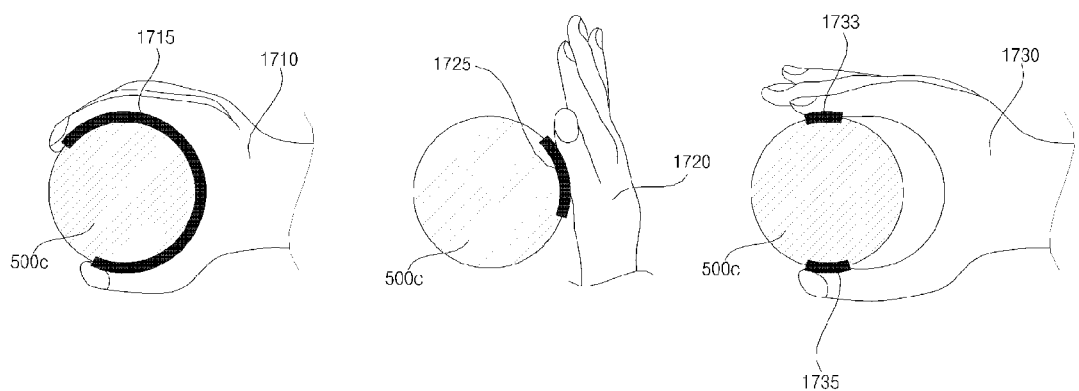
FIG. 17 is a diagram illustrating an example of an operation of a steering input apparatus according to the grip position or the grip pressure which is sensed on the circumference of a cross section of the steering wheel rim.

FIG. 17 illustrates an example of an operation of a steering input apparatus according to a grip position or a grip pressure which is sensed on the circumference of a cross section of the steering wheel rim.

Referring to FIG. 17, the processor 170 may receive grip position information on the steering wheel rim from the grip position sensor 111. The processor 170 may receive grip pressure information on the steering wheel rim from the grip pressure sensor 113.

Hereinafter, description will be mainly given of a grip area and grip pressure of the right hand. It should be noted that the description is also applicable to the left hand.

If the grip pressure is less than or equal to a reference pressure while the grip area along the circumference of a cross section 500c of the steering wheel rim is less than or equal to a reference area, the processor 170 may perform a control operation to output grip guide information.

For example, if a grip area corresponding to an extent to which most of the circumference of the cross section 500c of the steering wheel rim is gripped is sensed, and the grip pressure is greater than the reference pressure, the processor 170 may determine that the grip is normal. In this case, the area 1715 of contact between a hand 1710 of the user and the steering wheel rim may be greater than or equal to 20% of the overall circumference of the cross section 500c of the steering wheel rim. In this case, the processor 170 does not output grip guide information.

For example, if a grip area corresponding to an extent to which a palm of the user contacts one region of the circumference of the cross section 500c of the steering wheel rim is sensed, and the grip pressure is less than or equal to the reference pressure, the processor 170 may determine that the grip is abnormal. In this case, the area 1725 of contact between a hand 1720 of the user and the steering wheel rim may be less than 15% of the overall circumference of the cross section 500c of the steering wheel rim. In this case, the processor 170 may output grip guide information.

For example, if a grip area corresponding to an extent to which one or two fingers of the user contacts one region of the circumference of the cross section 500c of the steering wheel rim is sensed, and the grip pressure is less than or equal to the reference pressure, the processor 170 may determine that the grip is abnormal. In this case, the area 1733, 1735 of contact between the hand 1730 of the user and the steering wheel rim may be less than 15% of the overall circumference of the cross section 500c of the steering wheel rim. In this case, the processor 170 may output grip guide information.

As is apparent from the above description, implementations may have one or more of the following effects.

First, a grip position on a steering wheel may be announced to the user such that the user is alerted.

Second, a traffic accident caused by an improper grip on the steering wheel rim may be prevented.

Third, if the user does not properly grip the steering wheel despite warning, the vehicle may be directly controlled to guide safer driving.

Effects of implementations described herein are not limited to the aforementioned effects, and other effects which are not mentioned above will become apparent from the claims.

Implementations described above may be implemented as computer-readable code on a medium on which a program is recorded. The computer-readable medium includes all kinds of recording devices in which data readable by a computer system can be stored. Examples of the computer-readable medium include a hard disk drive (HDD), solid state disk (SSD), silicon disk drive (SDD), ROM, RAM, CD-ROM, magnetic tape, floppy disk, and optical data storage. Alternatively, implementations may be implemented in the form of a carrier wave (e.g., transmission over the Internet). In addition, the computer may include the processor 170 or the controller 770. Although some implementations have been disclosed for illustrative purposes, various modifications, additions and substitutions are possible, without departing from the scope and spirit of the invention as disclosed in the accompanying claims.

What is claimed is:

1. A steering input apparatus for a vehicle comprising:
  a grip position sensor configured to sense a grip position on a rim of a steering wheel of the vehicle; and
  at least one processor configured to:
    based on a determination that the grip position on the rim of the steering wheel sensed through the grip position sensor is improper for a driving situation of the vehicle, perform a control operation to output grip guide information for the rim of the steering wheel,
  wherein the at least one processor is further configured to:
    based on a determination that a grip of a first hand of a user is sensed on the steering input apparatus and that a grip of a second hand of the user is not sensed on the steering input apparatus, control a plurality of light emitters disposed in different regions of the rim of the steering wheel to emit light according to whether the driving situation of the vehicle corresponds to the vehicle travelling in a straight direction or along a curved road; and based on a determination of a collision between the vehicle and an object being sensed and based on a determination that the grip position sensed by the grip position sensor does not satisfy the output grip guide information, provide a steering control signal to a steering drive unit to change a driving direction of the vehicle or provide a brake control signal to a brake drive unit of the vehicle.

2. The steering input apparatus according to claim 1, further comprising:
a grip guide output unit configured to output the grip guide information.

3. The steering input apparatus according to claim 2, wherein the grip guide output unit is disposed in a region of the rim of the steering wheel designed to be gripped by both hands of a user.

4. The steering input apparatus according to claim 3, wherein the grip guide output unit comprises at least one light emitter, and
wherein the at least one processor is further configured to, based on the determination that the grip position on the rim of the steering wheel of the vehicle sensed through the grip position sensor is improper for the driving situation of the vehicle, control a light emitter disposed in a region of the rim of the steering wheel designed to be gripped by a hand of the user to emit light of a first color.

5. The steering input apparatus according to claim 4, wherein the at least one processor is further configured to:
based on a determination that a grip of a first hand of a user is sensed on the steering input apparatus and that a grip of a second hand of the user is not sensed on the steering input apparatus, control a light emitter disposed in a region of the rim of the steering wheel designed to be requiring gripped by the second hand of the user to emit light.

6. The steering input apparatus according to claim 4, wherein the at least one processor is further configured to:
based on a determination that the driving situation of the vehicle corresponds to the vehicle travelling in an entry section of a curved road, and that a grip of a first hand of a user is sensed in a region of the rim of the steering wheel that is improper for the driving situation corresponding to the vehicle travelling in an entry section of the curved road, and that a grip of a second hand of the user is not sensed on the steering input apparatus, control a plurality of light emitters disposed in regions of the rim of the steering wheel designed to be gripped by the first hand and the second hand of the user to emit light, the plurality of light emitters having positions along the rim of the steering wheel that correspond to a grip position that is proper for a curvature of the curved road.

7. The steering input apparatus according to claim 2, wherein the grip guide output unit is disposed in one region of a cluster, a dashboard, or a windshield.

8. The steering input apparatus according to claim 1, further comprising:
a grip pressure sensor configured to sense a grip pressure applied by a user on the rim of the steering wheel, wherein the at least one processor is further configured to:
based on a determination that the grip pressure sensed through the grip pressure sensor is less than or equal to a threshold pressure stored in a memory, output the grip guide information.

9. The steering input apparatus according to claim 8, wherein the at least one processor is further configured to set the threshold pressure based on a user grip pressure received through the grip pressure sensor in a reference grip pressure setting mode.

10. The steering input apparatus according to claim 8, further comprising:
a grip guide output unit configured to output the grip guide information,
wherein the grip guide output unit comprises at least one light emitter,
wherein the at least one processor is further configured to:
based on a determination that the grip pressure sensed through the grip pressure sensor is less than or equal to the threshold pressure stored in the memory, control a light emitter disposed in a region of the rim of the steering wheel designed to be gripped by a hand of a user to emit light of a second color.

11. The steering input apparatus according to claim 1, wherein the at least one processor is further configured to:
based on the output grip guide information and based on a determination that the grip position sensed by the grip position sensor satisfies the output grip guide information, stop outputting the grip guide information.

12. The steering input apparatus according to claim 1, further comprising:
a communication unit configured to communicate with at least one device other than the steering input apparatus, wherein the at least one processor is further configured to:
based on the determination that the grip position sensed by the grip position sensor does not satisfy the output grip guide information, provide grip position information to the at least one device other than the steering input apparatus.

13. The steering input apparatus according to claim 1, further comprising:
an interface unit,
wherein the at least one processor is further configured to:
based on a determination that driving alert situation information is received through the interface unit, and based on a determination that the grip position on the rim of the steering wheel sensed through the grip position sensor is improper for the received driving alert situation information, output the grip guide information.

14. The steering input apparatus according to claim 13, wherein the received driving alert situation information is based on at least one of road surface condition information, object detection information, weather information, surrounding illumination information, driver attentiveness information, driving road information, traffic light information, tire pressure information, or map information.

15. The steering input apparatus according to claim 1, wherein the at least one processor is further configured to:
based on a determination that a grip area of the grip position on the rim on the steering wheel detected through the grip position sensor is less than or equal to a threshold value of grip area, output the grip guide information.

16. The steering input apparatus according to claim 15, further comprising:
a grip guide output unit configured to output the grip guide information, wherein the grip guide output unit comprises at least one light emitter, wherein the at least one processor is further configured to control an intensity or color of light emitted from the at least one light emitter according to the grip area of the grip position detected through the grip position sensor.

17. The steering input apparatus according to claim 1, further comprising:

a grip pressure sensor configured to sense a grip pressure on the rim of the steering wheel, wherein the at least one processor is further configured to:
based on a determination that a grip area along a circumference of a cross section of the rim of the steering wheel for the grip position sensed through the grip position sensor is less than or equal to a threshold value of grip area, and based on a determination that the grip pressure sensed through the grip pressure sensor is less than or equal to a threshold value of grip pressure, perform a control operation to output the grip guide information.

18. A vehicle comprising the steering input apparatus according to claim 1.

19. A method of controlling a steering input apparatus for a vehicle, the method comprising:

based on a determination that a grip position on a rim of a steering wheel of the vehicle sensed through a grip position sensor is improper for a driving situation of the vehicle, perform a control operation to output grip guide information for the rim of the steering wheel;

based on a determination that a grip of a first hand of a user is sensed on the steering input apparatus and that a grip of a second hand of the user is not sensed on the steering input apparatus, control a plurality of light emitters disposed in different regions of the rim of the steering wheel to emit light according to whether the driving situation of the vehicle corresponds to the vehicle travelling in a straight direction or along a curved road; and based on a determination of a collision between the vehicle and an object being sensed and based on a determination that the grip position sensed by the grip position sensor does not satisfy the output grip guide information, provide a steering control signal to a steering drive unit to change a driving direction of the vehicle or provide a brake control signal to a brake drive unit of the vehicle.

20. At least one non-transitory computer-readable recording medium encoded with at least one computer program comprising instructions that, when executed, operate to cause a steering input apparatus for a vehicle to perform operations comprising:

based on a determination that a grip position on a rim of a steering wheel of the vehicle sensed through a grip position sensor is improper for a driving situation of the vehicle, perform a control operation to output grip guide information for the rim of the steering wheel;

based on a determination that a grip of a first hand of a user is sensed on the steering input apparatus and that a grip of a second hand of the user is not sensed on the steering input apparatus, control a plurality of light emitters disposed in different regions of the rim of the steering wheel to emit light according to whether the driving situation of the vehicle corresponds to the vehicle travelling in a straight direction or along a curved road; and based on a determination of a collision between the vehicle and an object being sensed and based on a determination that the grip position sensed by the grip position sensor does not satisfy the output grip guide information, provide a steering control signal to a steering drive unit to change a driving direction of the vehicle or provide a brake control signal to a brake drive unit of the vehicle.

\* \* \* \* \*